US010341263B2

(12) United States Patent
Zou et al.

(10) Patent No.: US 10,341,263 B2
(45) Date of Patent: Jul. 2, 2019

(54) SYSTEM AND METHOD FOR ROUTING NETWORK FRAMES BETWEEN VIRTUAL MACHINES

(71) Applicant: University of Central Florida Research Foundation, Inc., Orlando, FL (US)

(72) Inventors: Changchun Zou, Winter Springs, FL (US); Jim Bardgett, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 273 days.

(21) Appl. No.: 15/193,772

(22) Filed: Jun. 27, 2016

(65) Prior Publication Data

US 2016/0350151 A1 Dec. 1, 2016

Related U.S. Application Data

(63) Continuation-in-part of application No. 14/102,088, filed on Dec. 10, 2013.

(Continued)

(51) Int. Cl.

*H04L 12/931* (2013.01)
*G06F 9/455* (2018.01)

(Continued)

(52) U.S. Cl.

CPC .......... *H04L 49/70* (2013.01); *G06F 9/45558* (2013.01); *H04L 45/302* (2013.01);

(Continued)

(58) Field of Classification Search

CPC ....... G06F 9/45558; G06F 2009/45575; G06F 2009/45579; G06F 2009/45595;

(Continued)

(56) References Cited

U.S. PATENT DOCUMENTS 4,063,220 A 12/1977 Metcalfe et al.
4,400,769 A 8/1983 Kaneda et al.

(Continued)

OTHER PUBLICATIONS

WordPress & ThemeID. Hypervisor OpenVSwitch. Date Acessed: Mar. 10, 2014. http://openvswitch.org/.

(Continued)

*Primary Examiner* — Jacob D Dascomb
(74) *Attorney, Agent, or Firm* — Molly L. Sauter; Smith & Hopen, P.A.

(57) ABSTRACT

VM-to-VM switching is an enhancement to Ethernet card technology that enables virtual machines on the same hardware server platform to switch Ethernet Frames (or IP Packets) directly without exiting the server or using a slower and bandwidth limited software process in the hypervisor. The method does not require new network switch hardware. The invention creates a unique switching ability that allows users to modify parameters applied to Ethernet Frames passing between Virtual Machines, such as quality of service or firewall rules without adding considerable latency to the switching process. The hardware switching method enriches the functionality of the Ethernet Card and permits more advanced switching architectures in servers and thus increases density of VMs and reduces complexity of planning the location of virtual machines in a virtualized infrastructure.

20 Claims, 8 Drawing Sheets

Related U.S. Application Data

(60) Provisional application No. 61/735,299, filed on Dec. 10, 2012.

(51) Int. Cl.
*H04L 12/713* (2013.01)
*H04L 29/08* (2006.01)
*H04L 12/725* (2013.01)
*H04L 12/741* (2013.01)

(52) U.S. Cl.
CPC .......... *H04L 45/586* (2013.01); *H04L 67/322* (2013.01); *G06F 2009/45575* (2013.01); *G06F 2009/45579* (2013.01); *G06F 2009/45595* (2013.01); *H04L 45/745* (2013.01)

(58) Field of Classification Search
CPC ... H04L 45/302; H04L 45/586; H04L 45/745; H04L 67/322; H04L 49/70
See application file for complete search history.

(56) References Cited

U.S. PATENT DOCUMENTS

| | | | | |
|---|---|---|---|---|
| 6,275,797 | B1 | 8/2001 | Randic | |
| 7,068,666 | B2 | 6/2006 | Foster et al. | |
| 7,068,667 | B2 | 6/2006 | Foster et al. | |
| 7,131,123 | B2 | 10/2006 | Suorsa et al. | |
| 7,152,109 | B2 | 12/2006 | Suorsa et al. | |
| 7,409,719 | B2 | 8/2008 | Armstrong et al. | |
| 7,496,961 | B2 | 2/2009 | Zimmer et al. | |
| 7,499,438 | B2 | 3/2009 | Hinman et al. | |
| 7,797,748 | B2 | 9/2010 | Zheng et al. | |
| 7,835,380 | B1 | 11/2010 | Aloni et al. | |
| 7,865,908 | B2 | 1/2011 | Garg et al. | |
| 7,908,395 | B1 | 3/2011 | Salkewicz | |
| 8,014,413 | B2 | 9/2011 | Cummings et al. | |
| 8,046,480 | B2 | 10/2011 | Cohn | |
| 8,055,789 | B2 | 11/2011 | Richardson et al. | |
| 8,074,218 | B2 | 12/2011 | Eilam et al. | |
| 8,074,276 | B1 | 12/2011 | Beloussov et al. | |
| 8,086,765 | B2 | 12/2011 | Turner et al. | |
| 8,265,075 | B2 | 9/2012 | Pandey | |
| 2005/0138620 | A1 | 6/2005 | Lewites | |
| 2006/0045089 | A1 | 3/2006 | Bacher et al. | |
| 2006/0153122 | A1* | 7/2006 | Hinman | H04L 63/10 370/328 |
| 2007/0094367 | A1 | 4/2007 | Esfahany et al. | |
| 2007/0101323 | A1 | 5/2007 | Foley et al. | |
| 2007/0183418 | A1 | 8/2007 | Riddoch et al. | |
| 2008/0002683 | A1 | 1/2008 | Droux et al. | |
| 2008/0002703 | A1 | 1/2008 | Tripathi et al. | |
| 2008/0008141 | A1 | 1/2008 | Tchigevsky et al. | |
| 2008/0043765 | A1 | 2/2008 | Belgaied et al. | |
| 2008/0117909 | A1* | 5/2008 | Johnson | G06F 13/387 370/392 |
| 2008/0148341 | A1 | 6/2008 | Ferguson et al. | |
| 2008/0192648 | A1 | 8/2008 | Galles | |
| 2010/0107162 | A1 | 4/2010 | Edwards et al. | |
| 2010/0180014 | A1 | 7/2010 | Kannan et al. | |
| 2010/0232443 | A1* | 9/2010 | Pandey | H04L 49/70 370/401 |
| 2011/0007746 | A1* | 1/2011 | Mudigonda | G06F 9/45558 370/395.21 |
| 2013/0346531 | A1 | 12/2013 | Hummel et al. | |
| 2017/0214625 | A1* | 7/2017 | Dhanabalan | H04L 47/12 |

OTHER PUBLICATIONS

Part 3: Carrier Sense Multiple Access with Collision Detection (CSMA/CD) Access Method and Physical Layer Specifications. IEEE Standard for Information Telecommunications and information exchange between systems—Local and metropolitan area networks—Specific requirements—2008.
IEEE 802.1Qbg—Edge Virtual Bridging. Date Accessed Mar. 10, 2014. pp. 1-75. http://ieee802.org/1/pages/802.1bh.html.
IEEE 802.1Qbg—Edge Virtual Bridging. Date Accessed Mar. 10, 2014. pp. 76-150. http:/ieee802.org/1/pages/802.1bh.html.
IEEE 802.1Qbg—Edge Virtual Bridging. Date Accessed Mar. 10, 2014. pp. 151-233. http://ieee802.org/1/pages/802.1bh.html.
IEEE 802.1Qbg—Edge Virtual Bridging. Date Accessed Mar. 10, 2014. pp. 234-315. http://ieee802.org/1/pages/802.1bh.html.
IEEE 802.1Qbh—Bridge Port Extension. Date Accessed Mar. 10, 2014. http://ieee802.org/1/pages/802.1bh.html.
Bardgett and Zou. nSwitching: Virtual Machine aware relay hardware switching to improve intra-NIC Virtual Machine traffic. IEEE International Conference on Communications (ICC 2012). 2012: 2700-2706.

* cited by examiner

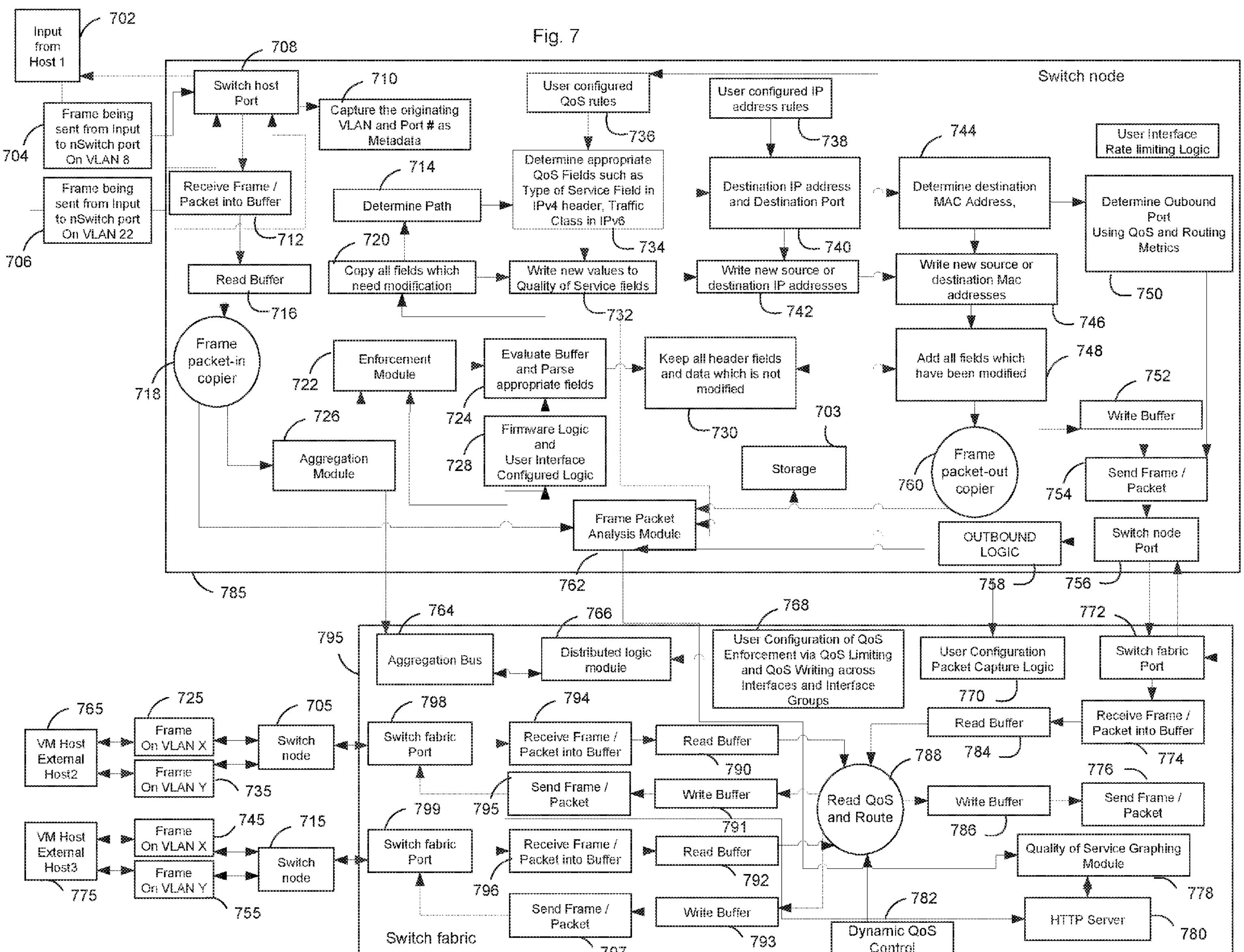
Fig. 7
702
Input from Host 1
Frame being sent from Input to nSwitch port On VLAN 8
704
Frame being sent from Input to nSwitch port On VLAN 22
706
Switch node
708
Switch host Port
710
Capture the originating VLAN and Port # as Metadata
Receive Frame / Packet into Buffer
712
Read Buffer
716
Frame packet-in copier
718
714
Determine Path
720
Copy all fields which need modification
User configured QoS rules
736
Determine appropriate QoS Fields such as Type of Service Field in IPv4 header, Traffic Class in IPv6
734
Write new values to Quality of Service fields
732
User configured IP address rules
738
Destination IP address and Destination Port
740
Write new source or destination IP addresses
742
744
Determine destination MAC Address,
Write new source or destination Mac addresses
746
User Interface Rate limiting Logic
Determine Oubound Port Using QoS and Routing Metrics
750
Enforcement Module
722
Evaluate Buffer and Parse appropriate fields
724
Keep all header fields and data which is not modified
730
Add all fields which have been modified
748
752
Write Buffer
726
Aggregation Module
728
Firmware Logic and User Interface Configured Logic
703
Storage
760
Frame packet-out copier
754
Send Frame / Packet
Frame Packet Analysis Module
OUTBOUND LOGIC
Switch node Port
785
762
758
756
764
766
768
772
795
Aggregation Bus
Distributed logic module
User Configuration of QoS Enforcement via QoS Limiting and QoS Writing across Interfaces and Interface Groups
User Configuration Packet Capture Logic
Switch fabric Port
765
725
705
VM Host External Host2
Frame On VLAN X
Frame On VLAN Y
735
Switch node
798
Switch fabric Port
794
Receive Frame / Packet into Buffer
Read Buffer
790
770
Read Buffer
784
Receive Frame / Packet into Buffer
774
788
Read QoS and Route
776
Send Frame / Packet
795
791
Write Buffer
786
Write Buffer
745
715
VM Host External Host3
Frame On VLAN X
Frame On VLAN Y
775
755
Switch node
799
Switch fabric Port
796
Receive Frame / Packet into Buffer
Read Buffer
792
Quality of Service Graphing Module
778
782
Send Frame / Packet
797
Write Buffer
793
Dynamic QoS Control
HTTP Server
780
Switch fabric

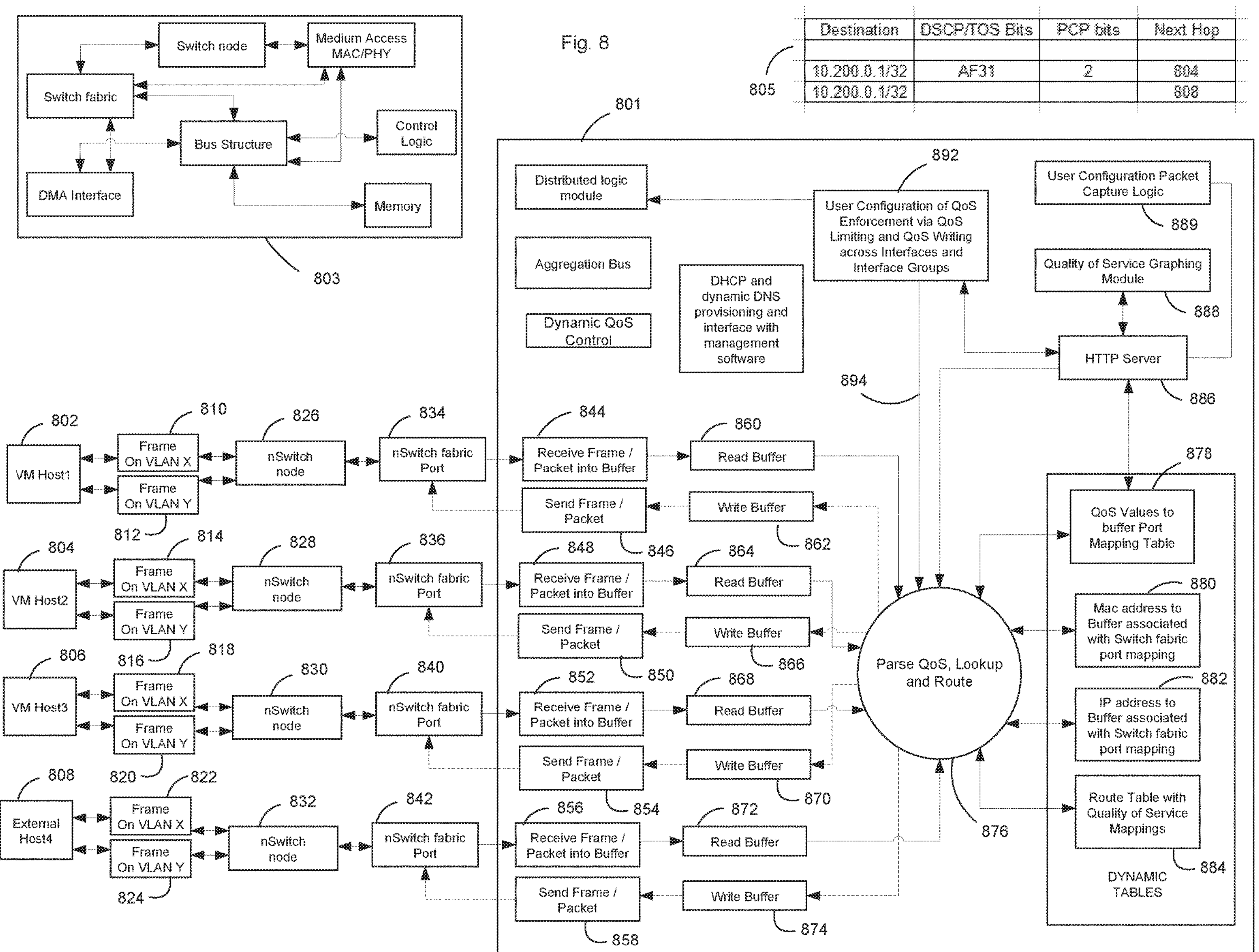
| Destination | DSCP/TOS Bits | PCP bits | Next Hop |
|---|---|---|---|
| 10.200.0.1/32 | AF31 | 2 | 804 |
| 10.200.0.1/32 | | | 808 |

SYSTEM AND METHOD FOR ROUTING NETWORK FRAMES BETWEEN VIRTUAL MACHINES

CROSS-REFERENCE TO RELATED APPLICATIONS

This application is a Continuation-in-Part (CIP) of, and claims priority to, U.S. patent application Ser. No. 14/102,088, filed on Dec. 10, 2013 and entitled "System and Method of Routing Network Frames Between Virtual Machines", which claims priority to U.S. Provisional Patent Application No. 61/735,299 filed on Dec. 10, 2012 and entitled "nSwitching: Virtual Machine Aware Relay Hardware Switching to Improve intra-NIC Virtual Machine Traffic". These applications are incorporated by reference herein in their entirety.

BACKGROUND OF THE INVENTION

Network architecture traditionally involves high level design based upon inputs received as requirements and objectives and includes the selection of hardware platforms which provide routing, switching and security. The data center server evolution has included rapid growth in CPU cores, increase in the number of separate physical processors on a single logic board and an increase in hardware density in the form of blade servers and single-board computers in multi-board chassis which provide common power and common mounting in data center racks or shelves. Equally dramatic is the virtualization of Operating Systems (OS), pushing CPU and I/O utilization to levels unachievable without Virtual Machines (VMs). Hypervisors that interface with the hardware server are themselves limited operating systems which provide hardware support to one or many self-contained operating system VM clients. Hypervisors, in combination with VMs, are improving hardware reduction beyond that achieved by stacking of multiple applications on a single computer which was the technique just a few years prior.

With the instantiation of multiple VMs on a single server, it is important to consider the frequent switching of frames between VMs on the same machine. Recent development on Ethernet switching to provide Single Root I/O Virtualization (SR-IOV) on network interface cards (NICs) improves Ethernet throughput for Virtual Machines (VMs) and lowers CPU loads. SR-IOV creates multiple receive queues on a NIC, directly accessible by VMs for frames coming from sources external to the Ethernet port. This virtualization of Ethernet ports and the presentation of frames directly to VMs eliminate a major cause for CPU loading by reducing the interrupts for receipt of inbound frames. However, SR-IOV cannot provide switching support for two VMs on the same computer.

Accordingly, what is needed is switching in software which is feasible at larger throughputs but retaining efficiency (e.g., rapid switching of frames between VMs), inclusion of security rules (e.g., firewall capability), and trust Quality of Service on frames between VMs. However, in view of the art considered as a whole at the time the present invention was made, it was not obvious to those of ordinary skill how the art could be advanced.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The long-standing but heretofore unfulfilled need for inter-VM switching in servers to provide the ability to have a range of interdependent multi-tier software applications, which are isolated in separate virtual machines (VMs) for security and resiliency purposes, resident on a single hardware system, thereby reducing the single client footprint inside of a Cloud Computing Providers Network, is now met by a new, useful and nonobvious VM-to-VM switch invention.

An embodiment of the present invention provides a method of routing network frames between virtual machines on a common physical server. The method includes associating a virtual machine-to-virtual machine (VM-to-VM) switch embedded in a network interface card (NIC) with a physical port of the NIC, establishing one or more virtual ports of the VM-to-VM switch and associating one virtual machine (VM) with each of the virtual ports of the VM-to-VM switch. The method further includes, routing network frames between the VMs associated with the virtual ports through the VM-to-VM switch.

In a particular embodiment, the method of routing network frames between virtual machines on a common physical server in accordance with the present invention is embodied in software embedded in a non-transitory software medium operable on a network interface card (NIC).

An additional embodiment of the present invention provides a virtual machine-to-virtual machine (VM-to-VM) switch. The VM-to-VM switch includes initialization circuitry configured for associating a virtual machine-to-virtual machine (VM-to-VM) switch embedded in a network interface card (NIC) with a physical port of the NIC, for establishing one or more virtual ports of the VM-to-VM switch and for associating one virtual machine (VM) with each of the virtual ports of the VM-to-VM switch and routing circuitry configured for routing network frames between the VMs associated with the virtual ports through the VM-to-VM switch.

In an additional embodiment, the VM-to-VM switch further includes VLAN rewriting circuitry. The VLAN rewriting circuitry controls the rewriting of the VLAN ID in the network frames passing between two VMs, thereby implementing offloading of the hypervisor switch to the VM-to-VM switch which will eliminate hypervisor switching and force all traffic through the NIC to provide improved hardware switching. Additionally offloading of the hypervisor switching to the VM-to-VM switch utilizing the VLAN rewriting circuitry and will allow monitoring of all VM-to-VM traffic, which is a key requirement for application troubleshooting.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

Accompanying drawings show one or more embodiment, however, the accompanying drawings should not be taken to limit the invention to only the embodiments shown. Various aspects and advantages will become apparent upon review of the following detailed description and upon reference to the drawings in which:

FIG. 7 is a block diagram illustrating the switch logic of the VM-to-VM switch in accordance with an embodiment of the present invention.

FIG. 8 is a block diagram illustrating additional features of the switch logic of the VM-to-VM switch in accordance with an embodiment of the present invention.

DETAILED DESCRIPTION

In the following detailed description of the embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

An embodiment of the present invention provides the integration of VM-to-VM switching functionality into a network interface card (NIC) to enable hardware-based switching for inter-VM traffic on a single computer that has a single or multi-socket, multi-core CPU. The VM-to-VM switch functionality can also be contained in circuit logic or on an field-programmable gate array (FPGA), which is integrated onto a Peripheral Component Interconnect Express (PCIe) card and inserted into the computer's PCI slot. Compared to software-based switching in the hypervisor, the VM-to-VM switch functionality greatly reduces central processing unit (CPU) utilization and permits efficient network traffic monitoring for on-board inter-VM I/O. Additionally, the incorporation of the VM-to-VM switch eliminates the back-and-forth usage of external port or channel bandwidth for internal VM communications. In contrast with current industry standards 802.1Qbg and 802.1Qbh, which assist network traffic between VMs, the VM-to-VM switch of the present invention does not require costly replacement of the Ethernet NICs or replacement of the data center external physical switch infrastructure.

Figure 1:
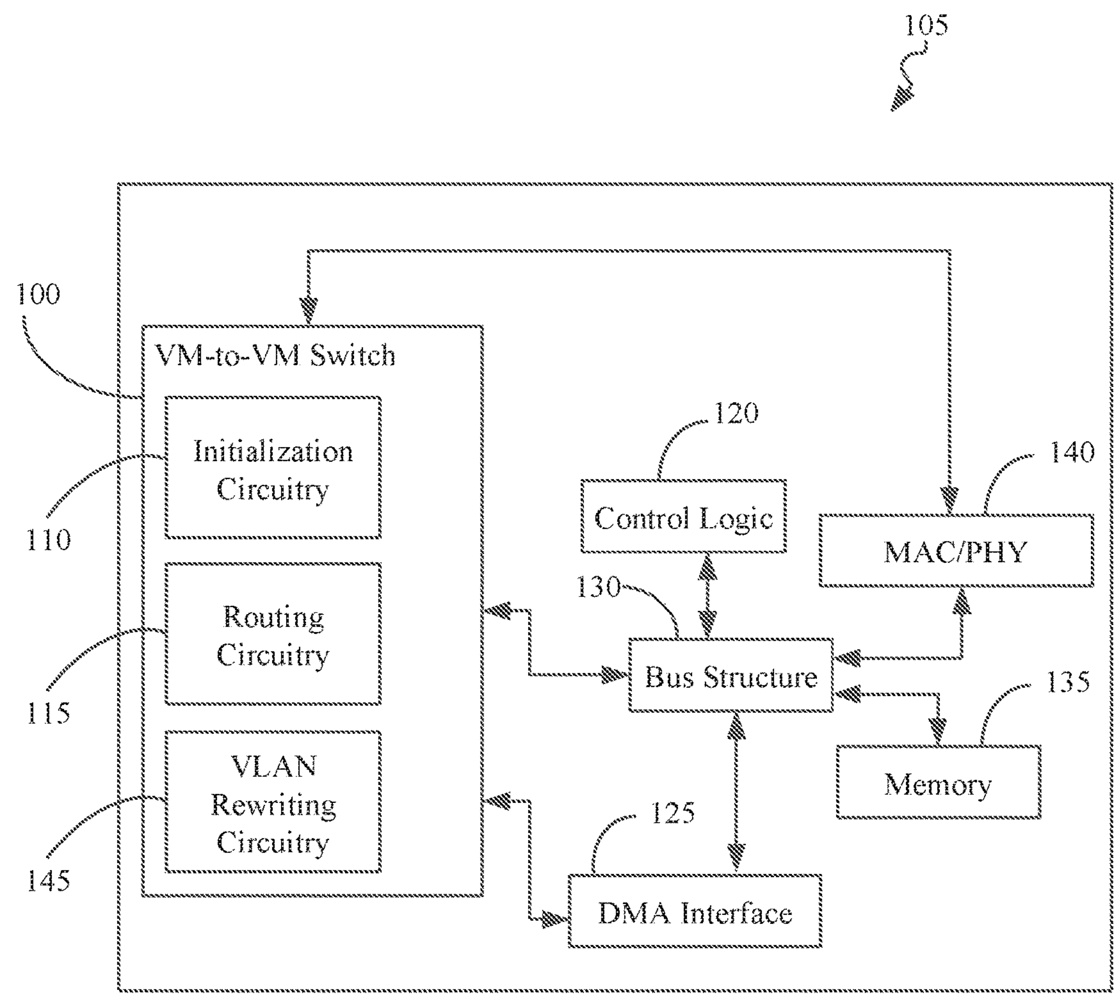
FIG. 1 is a block diagram illustrating the architecture of an VM-to-VM switch embedded in a NIC according to an embodiment of the present invention.

With reference to FIG. 1, the VM-to-VM switch 100 is embedded in a NIC 105, such as an Ethernet NIC. The VM-to-VM switch 100 in accordance with an embodiment of the present invention includes initialization circuitry 110 configured for associating a virtual machine-to-virtual machine (VM-to-VM) switch embedded in a network interface card (NIC) with a physical port of the NIC 105. The initialization circuitry 110 is additionally configured for establishing one or more virtual ports of the VM-to-VM switch and for associating one virtual machine (VM) with each of the virtual ports of the VM-to-VM switch. The VM-to-VM switch further includes routing circuitry 115 configured for routing network frames between the VMs associated with the virtual ports through the VM-to-VM switch 100. The NIC 105 may further included additional circuitry known in the art and coupled to a bus structure 130 including, control logic 120, a direct memory access (DMA) interface 125, memory 135 and a media access control and physical (MAC/PHY) interface 140. VM-to-VM switch 100 is a modular architecture containing logic circuitry which permits redirection of a layer 2 frame which originated on one VM and is destined for another VM on the same computer without passing through the MAC/PHY circuitry for connection with the external network switch Ethernet port.

The VM-to-VM switch 100 additionally includes virtual local area network (VLAN) rewriting circuitry 145. The VLAN rewriting circuitry 145 is configured intercept networking frames to be communicated between two VMs. The VLAN rewriting circuitry 145 is configured for identifying a VLAN ID within an intercepted network frame, wherein the VLAN ID is unique to the source VM from which the network frame originated. The VLAN rewriting circuitry 145 is further configured for rewriting the VLAN ID of the source VM in the intercepted network frame to the unique VLAN ID of the destination VM. Rewriting the VLAN ID permits onboard routing and eliminates hypervisor switching. This hypervisor switch offload is easily set on VMs using unique VLANs for each VM which network frames are to be forced through the VM-to-VM switch 100.

In combination with the VLAN rewriting circuitry 145, the routing circuitry 115 of the VM-to-VM switch also permits the exchange of IP packets by providing layer 3 capabilities and VM-to-VM switching at Layer 3 with a unique addition of allowing the switch to make switching decisions across VLANs, if so configured. This function will allow VMs in different address ranges to communicate without exiting the switch on a single NIC and without requiring an external physical Layer 3 router and routing protocol such as Open Shortest Path First (OSPF) routing protocol. No routing protocol is required to be configured on the NIC for this to occur.

Figure 2:
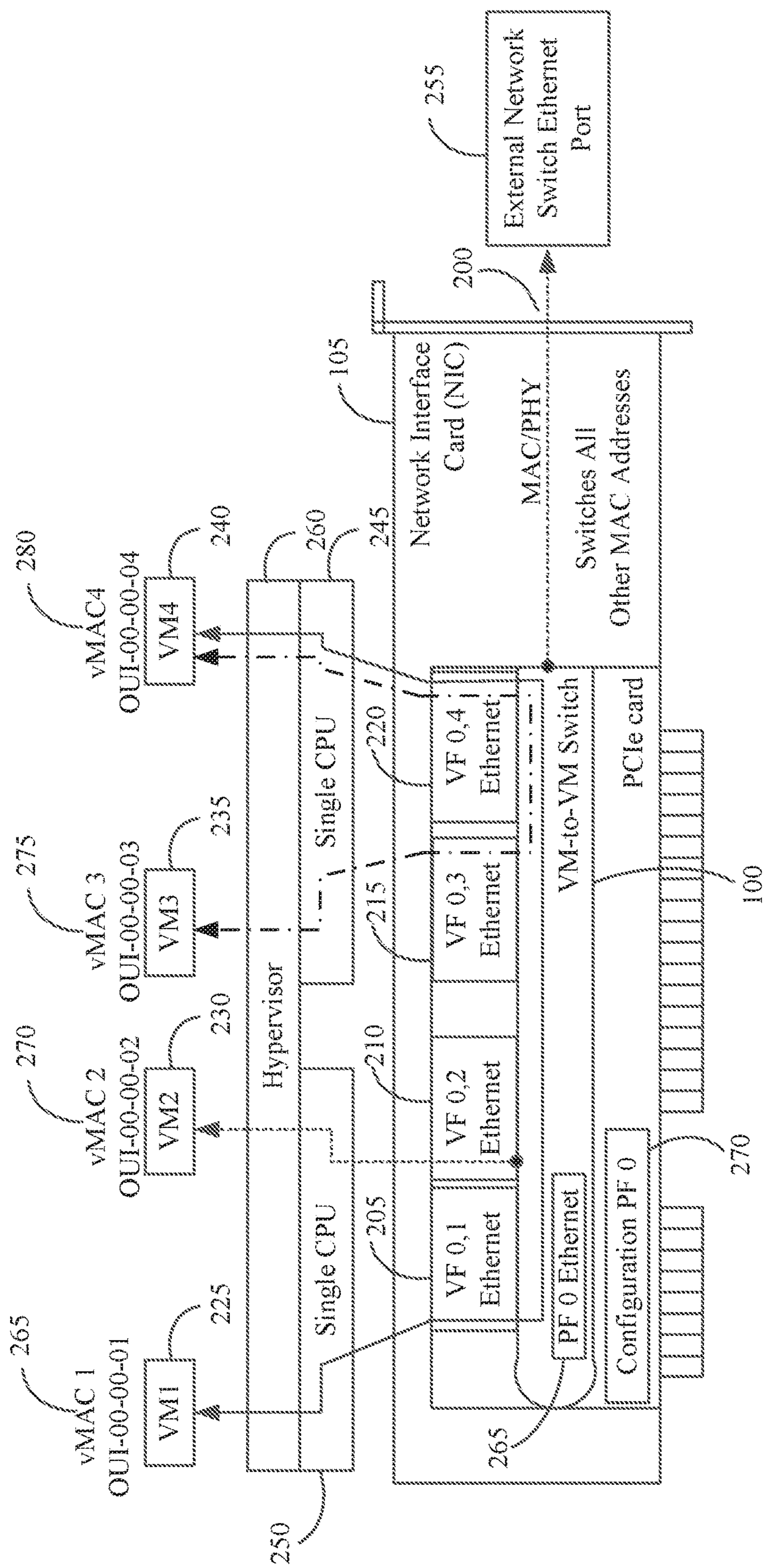
FIG. 2 is block diagram illustrating a VM-to-VM switch providing network frame routing paths for VMs on a common physical server employing a single NIC and a single physical port according to an embodiment of the present invention.

FIG. 2 illustrates the implementation of the VM-to-VM switch 100 into a single Ethernet port NIC 105 with a single on-board VM-to-VM switch 100. This embodiment is capable of supporting multiple CPUs and multiple CPUs in multiple sockets. With reference to FIG. 2, the VM-to-VM switch 100 is embedded in a NIC 105 and the initialization circuitry 110 of the switch 100 is configured for associating the VM-to-VM switch 100 with a physical port 200 of the NIC 105. The initialization circuitry 110 is additionally configured for establishing one or more virtual ports 205, 210, 215, 220 of the VM-to-VM switch and for associating one virtual machine (VM) 225, 230, 235, 240 with each of the virtual ports 205, 210, 215, 220 of the VM-to-VM switch 100. A natural extension is to assign multiple virtual ports to a single VM. As shown, VM1 225 and VM2 230 are associated with one single CPU 250 and VM3 235 and VM4 240 are associated with another single CPU 245. The VM-to-VM switch further includes routing circuitry 115 configured for routing network frames between the VMs 225, 230, 235, 240 associated with the virtual ports 205, 210, 215, 220 through the VM-to-VM switch 100. As such, if multiple CPUs exist on a common physical server and there is communication between VM3 235 and VM4 240, the VM-to-VM switch 100 routes network frames between VM3 235 and VM4 240, which reside on the same CPU 245, and as an alternative example, if communications occurs between VM1 225 and VM4 240, which reside on different CPUs 245, 250, without requiring that the frames exit the NIC 105 and be routed by the external network switch 255. As shown in FIG. 2, intra-CPU VM-VM communication is accomplished by routing the network frames from VM3 235 to VM4 240, through the VM-to-VM switch 100. Inter-CPU VM-VM communication is accomplished by routing the network frames from VM1 225 to VM4 240, through the VM-to-VM switch 100 and internal VM to external computer communication is accomplished by routing the network frames from VM2 230 to the external network switch Ethernet port 255.

The initialization circuitry 110 of the VM-to-VM switch 100 is further configured for storing the association between the VMs 225, 230, 235, 240 and the virtual ports 205, 210, 215, 220 of the VM-to-VM switch 100 in a look-up table. The routing circuitry 115 is further configured for receiving a network frame originating from a source VM, at the VM-to-VM switch 100, the network frame identifying a destination VM, and for accessing the look-up table to identify the virtual port associated with the destination VM and routing the network frame to the destination VM through the VM-to-VM switch 100. As such, the logic of the VM-to-VM switch 100 ensures that the switching and routing functionality is not dependent upon attaching a VM to a specific CPU. Additionally the VM-to-VM switch 100 is capable of providing the routing of frames between VMs across a logic board for a server series computer system which is manufactured for multiple CPUs such as existing two and four processor, or higher density, logic boards including multi-socket boards.

In one embodiment, the initialization circuitry is further configured for identifying a virtual media access control (vMAC) address 265, 270, 275, 280 of each VM 225, 230, 235, 240 and for associating the vMAC address 265, 270, 275, 280 of the VM 225, 230, 235, 240 with one of the virtual ports 205, 210, 215, 220 of the VM-to-VM switch 100. The VLAN ID is associated with the vMAC addresses 265, 270, 275, 280 of the VMs and permits the VLAN rewriting circuitry 145 to capture the traffic in the VM-to-VM switch 100 and to provide traffic analysis, which is not existent in current hypervisors without incurring extreme CPU loading.

The VM-to-VM switch 100 is envisioned in embodiments which operate with or without a hypervisor 260 or virtual machine manager (VMM) switching. The logic of the VM-to-VM switch 100 is not limited by the number of hypervisors 260 operating concurrently on a computer system.

In one embodiment the NIC 105 is a single root I/O virtualization (SR-IOV) enabled NIC and the VM-to-VM switch 100 is an SR-IOV enabled switch permitting use of physical functions (PFs) 265 and virtual functions (VFs) 205, 210, 215, 220 to present a physical device, such as a single root port on a Peripheral Component Interconnect Express (PCIe) to appear to be multiple separate physical devices to the hypervisor 260. SR-IOV specifies a PF 270 to manage global functions for the SR-IOV devices. PFs are full PCIe functions that include the SR-IOV Extended Capability which is used to configure and manage the SR-IOV functionality. It is possible to configure or control PCIe devices using PFs, and the PF has full ability to move data in and out of the device. VFs are lightweight PCIe functions that contain all the resources necessary for data movement but have a carefully minimized set of configuration resources.

The VM-to-VM switch 100 enhances the SR-IOV architecture of a NIC 105. In SR-IOV, VFs are used for frames and PFs are used to provide a redirection or reflective relay function. The VM-to-VM switch 100 of the present invention is fully compatible with SR-IOV. In addition to standard functionality, VM-to-VM switch 100 functionality is integrated into the NIC 105, permitting control of the switch path through the card from VM to VM and from VM to the external ports. VM-to-VM switch 100 provides the ability to switch layer 2 frames and their contents between endpoints using table association methods which describe a vMAC Address and the associated path or port on the system. The vMAC Address may be assigned by the NIC, operating system (OS) on the VM or management software and is supported by an SR-IOV aware hypervisor on a virtualization aware CPU. The vMAC address includes an Organizationally Unique Identifier (OUI), which is a 24-bit number that uniquely identifies a vendor, manufacturer, or other organization globally or worldwide as well as serial number. OUIs are used to uniquely identify a particular piece of equipment as Ethernet vMAC addresses, World Wide Names for Fiber Channel host bus adapters, and other Fiber Channel and Serial Attached SCSI devices. In vMAC addresses, the OUI is combined with a 24-bit number (assigned by the owner or 'assignee' of the OUI) to form the address and the first three octets of the address are the OUI.

The NIC 105 of FIG. 2 has the Physical Functions (PFs) 265 associated with the physical interfaces and Virtual Functions (VFs) associated with each of the virtual ports 205, 210, 215, 220. When referring to a VF, a PF is required, so the number pair is the PF, VF of format VF0,1 for VF1 associated with PF0, which represent the physical interface to VMs. PFs and VFs are defined in detail in the SR-IOV specification. The Configuration PF 0 270, which configures the functionality of PF 0 Ethernet 265, is modified to allow VM-to-VM switch 100 functionality within the NIC 105. Pseudo code for the single PF 265, corresponding to a single Ethernet Port. Modifying the Configuration PF 0 270 structure with the pseudo-code of the VM-to-VM switch allows the routing function of SR-IOV to permit the VF-to-VF communication using reflective relay.

The VM-to-VM switch 100 may be hard coded in logic with code represented by pseudo code. According to the steady state pseudo code, upon receipt of a networking frame from a VF, the source and destination OUI are compared and prioritized based on 802.1p marking from the VM as follows:

Case 0: equal source and destination OUI, look up the destination VF and route packet to that VF for the associated VM Case 1: unequal source and destination OUI, send to PCIe port Case 2: follow SR-IOV for receipt of a frame from PCIe port Other table lookup schemes are envisioned using the table associations mentioned above.

In the VM-to-VM switch 100 the routing circuitry is further configured for receiving a network frame originating from a source VM, the network frame including a vMAC address of the source VM and a vMAC address of the destination VM, wherein each vMAC address includes an Organizationally Unique Identifier (OUI) identifying a Physical Function (PF) of the SR-IOV enabled switch, for comparing the vMAC address of the source VM and the vMAC address of the destination VM of the network frame and if the OUI of the vMAC address of the source VM is equal to the OUI of the vMAC address of the destination VM of the network frame, using the vMAC address of the destination VM to identify the VF associated with the destination VM and for routing the network frame to the VF associated with the destination VM. Alternatively a list of VMs on the local computer is kept and it is envisioned that other lookup keys would be of particular value for determining destination of the network frame.

Figure 3:
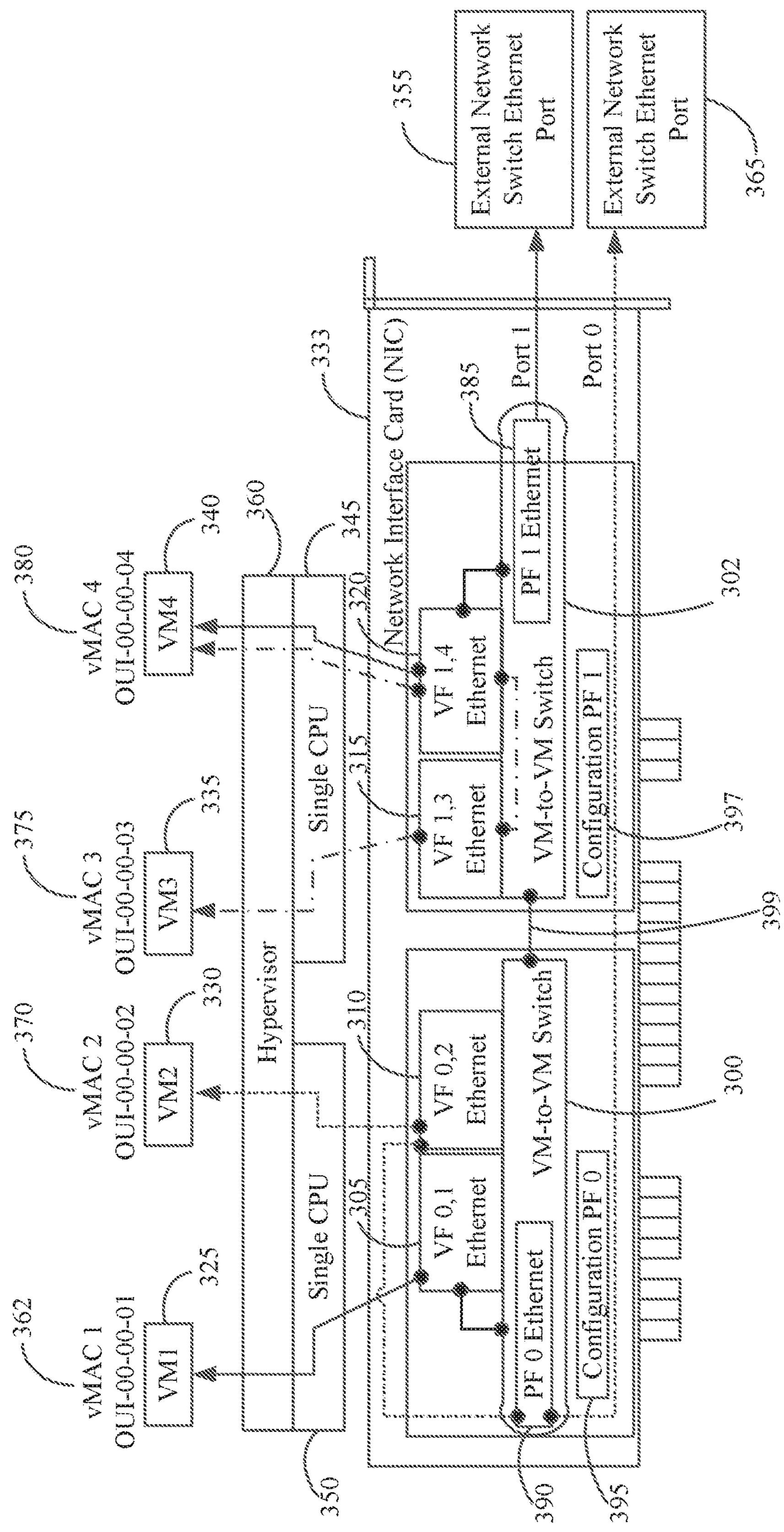
FIG. 3 is block diagram illustrating a VM-to-VM switch providing network frame routing paths for VMs on a common physical server employing a single NIC having multiple physical ports according to an embodiment of the present invention.

With reference to FIG. 3, for a NIC 333 with multiple Ethernet ports (Port 1 and Port 0), the VM-to-VM switch can employ additional architectural features. In FIG. 3, a multi-CPU 345, 350 system with a single hypervisor 360 and four VMs 325, 330, 335, 340 is illustrated. The VMs 325, 330, 335, 340 can be pinned to the CPU or capable of migration. The NIC 333 uses standard methods or those associated with SR-IOV including the associated interfaces. The NIC 333 includes two VM-to-VM switches 300, 302. In an SR-IOV embodiment, each VM-to-VM switch 300, 302 includes a physical function 385, 390 and associated configuration space 395, 397, as previously described. The initialization circuitry of the VM-to-VM switch establishes the association between the VMs 325, 330, 335, 340 and the virtual functions 305, 310, 315 and 320, as illustrated. The initialization circuitry may store the vMAC addresses 362, 370, 375, 380 and the associated VFs 305, 310, 315 and 320 in a look-up table. The VM-to-VM switch enhanced NIC card of FIG. 3 illustrates two Ports, labeled Port 0 and Port 1, which connect to external switch ports 355, 365 without limitation such that they may be trunked such as using 802.1Q, bonded, and pass typical discovery protocols and fiber channel over Ethernet (FCoE).

The communications illustrated in FIG. 3 between VM3 335 and VM4 340, is IP over Ethernet and in this case the vMAC is assigned by the VM-to-VM switch 302, transparent to the hypervisor 360 or VMs. The VFs 305, 310, 315 are instantiated to support the VMs 325, 330, 335, 340 as required and VM3 335 is given a vMAC Address 375 of OUI-00-00-03 where OUI represents the assigned organizational unit identifier by the IEEE OUI Assignment Authority. This may be assigned in any method as described prior, internal to the VM-to-VM switch, Operating System (OS), Hypervisor, VMM, or VM.

Intra-CPU VM-VM Communications between VM3 335 and VM4 340 take place in logic which may be contained in hardware and manipulated through software on the VM-to-VM switch 302. VM3 335 communicates with VM4 340 by initiating a communications which could be a first packet of at 3-way TCP handshake to establish reliable communications. In this case the path of the network frame is denoted illustrated, wherein the network frame travels through the hypervisor 360 normally. Methods exist for the VM-to-VM switch 302 to permit direct hypervisor switching or preventing it such as using an encapsulation method between the VM and VM-to-VM switch 302. This feature allows VM-to-VM switch 302 to completely control the switching path on the local machine and not be subject to hypervisor switching limitations which can drive CPU utilization.

VM-to-VM switch 302 communications between VM3 335 and VM4 340 consist of internal redirection (sometimes called reflective relay or hair pin turn) from one VM to another throughout the communication and routing of the network frames. A table maintained by the VM-to-VM switch 302 on the vMAC addresses 362, 370, 375, 380 issued to the VMs 325, 330, 335, 340 identifies the communication as local and allows rapid switching in the architecture of the NIC 333. In the case of multiple network ports which connect to network devices, the VM-to-VM switch 302 fabric which is facilitating the VM3 335 to VM4 340 communications is also used to pass traffic to the external network interface Port 1 which is connected to a physical external network switch Ethernet port 355.

The same VM-to-VM switch 302 fabric attached to Port 1 has a path to an additional VM-to-VM switch 300 fabric which is connected to Port 0 thus permitting internal communications between VM1 325 and VM4 340. This hierarchy is envisioned to permit communications to extend beyond a single VM-to-VM switch 302 or server permitting multiple logic board chassis or blade server intercommunications without network port bandwidth limitations.

The communication path from VM1 325 to VM4 340 passes through Virtual Function (VF) 305, VM-to-VM switch 300, across the core pathway 399 to VM-to-VM switch 302, then to VF 320 and arrives at VM4 340. This path is proposed but may be optimized depending on other architectural considerations including interfaces and computer architecture details such as Intel VT-x, VT-d technology, SR-IOV and AMD IOMMU.

Onboard routing, hypervisor switch offloading and network frame capturing for traffic monitoring are envisioned as becoming isolated functions in hardware as port density and switch throughput increase, such that they are hardware or coded in Verilog or VHDL as separate hardware logic features.

FIG. 3 illustrates the VM-to-VM switch architecture with multiple SR-IOV architectural PF elements 385, 390 in a multi-port Ethernet NIC 333 which builds on the SR-IOV functions. FIG. 3 shows the additional network frame paths available for communications between VM1 325 and VM4 340 which reside on different external physical ports (represented by different PFs). VM1 325 is associated with VF0,1 305 (i.e., the VF number 1 associated with PF 0). VF0,1 is presented to the Guest OS on VM1 325 because the hypervisor 360 is SR-IOV aware. In this case, the role of VF0, 1 305 is to receive a network frame from VM1 325 and the PF 0 Ethernet 390 switches the frame to the PF 1 Ethernet 385 using the VM-to-VM switches 300, 302 and the corresponding pseudo code. The design shows a connection between the two physical functions supported by configuration of the data path in the core. As such, the SR-IOV Virtual Functions are enhanced by the pseudo code of the VM-to-VM switch. As the VM-to-VM switch enhancement is applied to the routing function, the change to the NIC software permits inter-VF communications through an existing switch structure in the core.

FIG. 3 illustrates the network frame path for a multiple port SR-IOV enabled NIC 333 with multi-VM 325, 330, 335, 340, multi-CPU 345, 350 architecture for the VM-to-VM switch 300, 302. The initialization circuitry of the VM-to-VM switch 300, 302 associates each PF 385, 390, which is correlated to a physical port on the NIC 333, to a separate function to provide an individual VF 305, 310, 315, 320 for each VM 325, 330, 335, 340. As shown in FIG. 3, the network frame path for intra CPU VM-VM communications on a single CPU follows the path from VM3 335 to VM4 340 through the VM-to-VM switch 302. The network frame path for inter-CPU VM-VM communications across CPUs (between CPU 345 and CPU 350) follows the path as shown from VM1 325 to VM4 340, and the network frame path for internal VM to External Traffic PF 0 is used and all PCIe structures are used for physical frame transmission including internal scheduling, framing, encoding, signal generation, etc.

Figure 4:
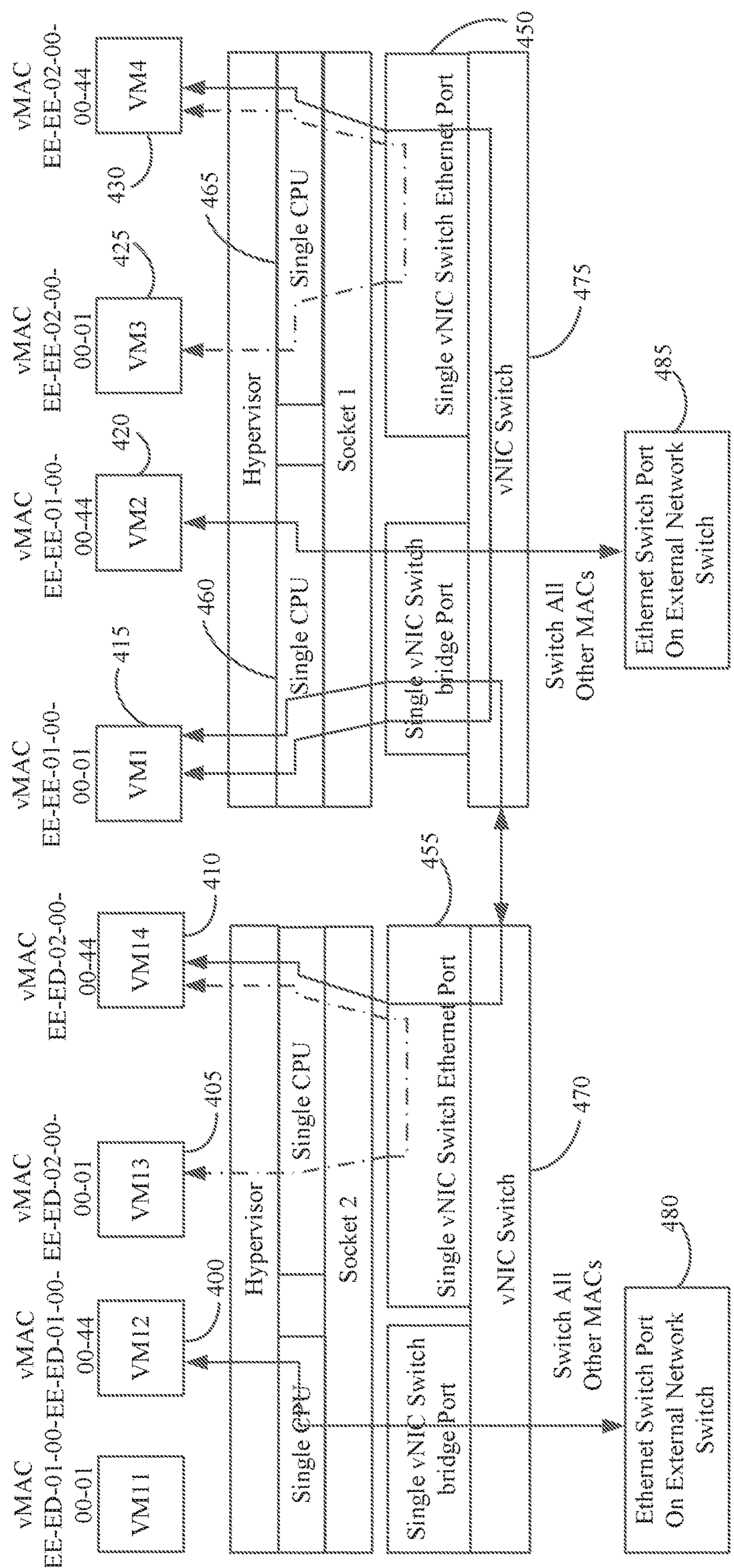
FIG. 4 is block diagram illustrating a VM-to-VM switch providing network frame routing paths for VMs on a common physical server employing multiple NICs according to an embodiment of the present invention.

The pseudo code and architecture of the VM-to-VM switch can be expanded as shown in FIG. 4. The logic and features of the VM-to-VM switch can be expanded from VM-VM frame redirection as shown by the network frame path between VM3 425 to VM4 430 through single vNIC switch Ethernet port 450 and the path between VM13 405 and VM14 410 through single vNIC switch Ethernet port 455, which occurs with basic logic based on organizational unit identifiers (OUI) in the vMAC address, but can be extended. As shown in FIG. 4, the VM-VM frame redirection is also implemented in the VM-to-VM switch across multiple CPUs in the same socket on the same logic board, such as the network frame traffic between VM1 415 on CPU 460 and VM4 430 on CPU 465. Additionally, frame traffic and the contents can easily communicate between modules within single vNIC switch Ethernet ports 450, 455 through vNic switches 470, 475, as shown by the path between VM1 415 and VM14 410, using pathways within gate arrays or logic easily deployed in semiconductors. Multiple blades are envisioned in multiple methods to include VM-to-VM logic or common blade chassis switches. VM to off board MAC switching, as illustrated by the path between VM12 400 and external switch port on external network switch 480 and the path between VM2 420 and the Ethernet switch port on external network switch 485 is representative of a connection to a PF, I/O logic and a network connection to include other network device. Logical order is adjustable in order or composition to achieve the objectives of the larger network architecture and the data center architecture to allow modification of the order of the switching decisions shown. For example, Layer 3 IP addresses and masks may be checked first to validate if trunking bypass and if enabling or disabling hypervisor switch offloading is needed, if desired by the user to permit a local switching decision to override larger network architecture for operational objectives. This is useful to allow traffic to stay local to the NIC even for inter-VLAN switching requirements. Trunking bypass would allow 802.1q tags if employed in the VM-to-VM architecture to be disregarded in a user configurable method such that direction between VMs is still achievable for devices on differing VLANs and with differing IP subnet ranges. A user management console may be used to configure the relationships of VMs or Application Servers to bypass trunking, thereby allowing direct communications with VMs. In one embodiment, the VMs associated with the virtual ports may be located on different virtual local area networks (VLANs) and the VM-to-VM switch may incorporate the use of a router protocol of the VM-to-VM switch to route the network frames between the VMs associated with the virtual ports.

Figure 5:
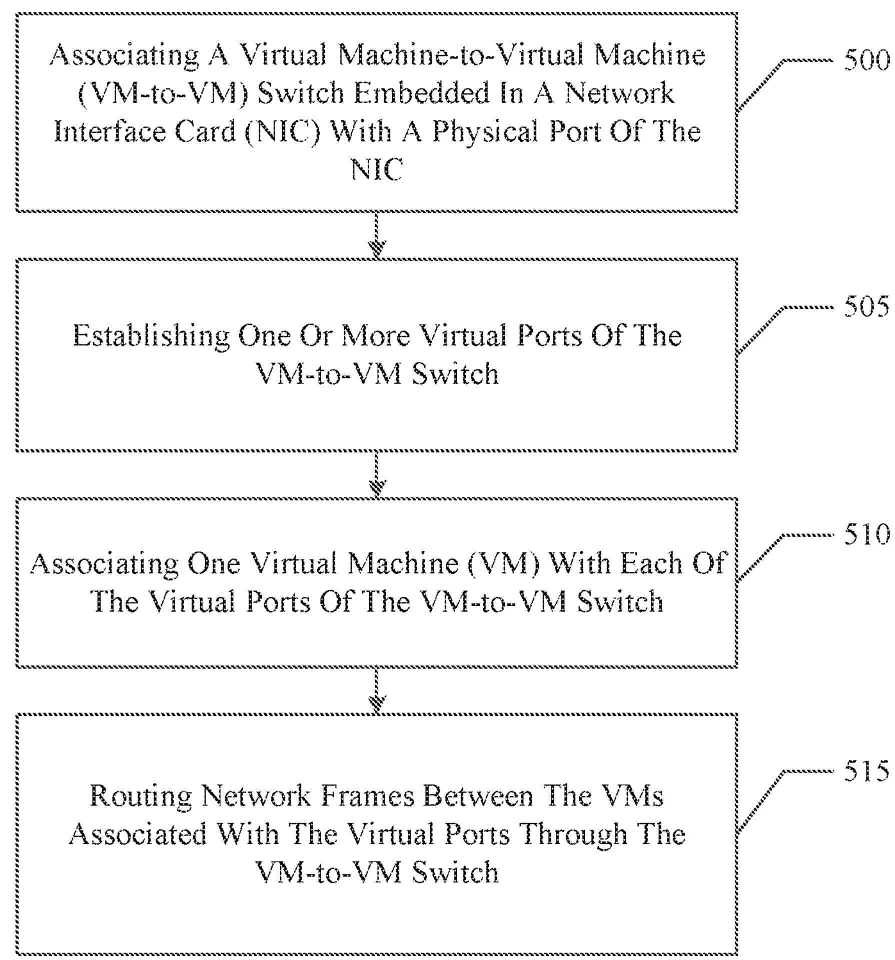
FIG. 5 is a flow diagram illustrating a method of routing network frames between VMs in accordance with an embodiment of the present invention.

With reference to FIG. 5, in operation of the VM-to-VM switch, a method of routing network frames between virtual machines on a common physical server includes, associating a virtual machine-to-virtual machine (VM-to-VM) switch embedded in a network interface card (NIC) with a physical port of the NIC 500. The method further includes, establishing one or more virtual ports of the VM-to-VM switch 505 and associating one virtual machine (VM) with each of the virtual ports of the VM-to-VM switch 510. Associating the one VM with each of the virtual ports of the VM-to-VM switch may further include, storing the association between the VMs and the virtual ports of the VM-to-VM switch in a look-up table. In an additional embodiment, associating one VM with each of the virtual ports of the VM-to-VM switch may further include identifying a virtual media access control (vMAC) address of each VM and associating the vMAC address of the VM with one of the virtual ports of the VM-to-VM switch. In one embodiment, associating a virtual machine-to-virtual machine (VM-to-VM) switch embedded in a network interface card (NIC) with a physical port of the NIC, establishing one or more virtual ports of the VM-to-VM switch 505 and associating one virtual machine (VM) with each of the virtual ports of the VM-to-VM switch is performed by the initialization circuitry 110 of the VM-to-VM switch 100.

The method further includes routing network frames between the VMs associated with the virtual ports through the VM-to-VM switch 515. Routing network frames between the VMs associated with the virtual ports through the VM-to-VM switch may further include storing the association between the VMs and the virtual ports of the VM-to-VM switch in a look-up table, receiving a network frame originating from a source VM, at the VM-to-VM switch, the network frame identifying a destination VM via the vMAC address or other method and accessing the look-up table to identify the virtual port associated with the destination VM and routing the network frame to the destination VM through the VM-to-VM switch. In one embodiment, routing network frames between the VMs associated with the virtual ports through the VM-to-VM switch is performed by the routing circuitry 115 of the VM-to-VM switch 100.

Figure 6:
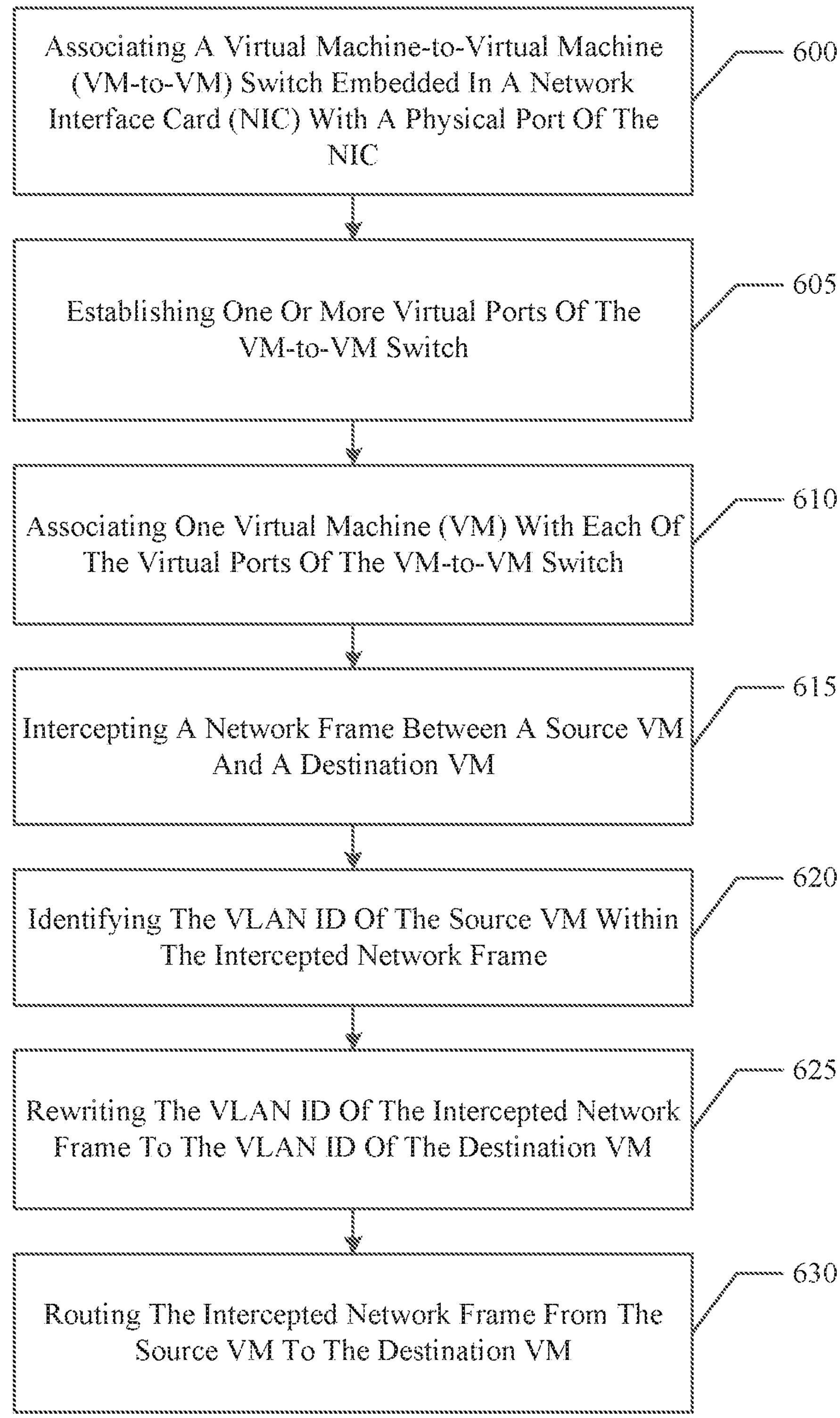
FIG. 6 is a flow diagram illustrating a method of routing network frames between VMs utilizing hypervisor switch offloading in accordance with an embodiment of the present invention.

With reference to FIG. 6, in operation of the VM-to-VM switch employing hypervisor switch offloading, a method of routing network frames between virtual machines on a common physical server includes, associating a virtual machine-to-virtual machine (VM-to-VM) switch embedded in a network interface card (NIC) with a physical port of the NIC 600. The method further includes, establishing one or more virtual ports of the VM-to-VM switch 605 and associating one virtual machine (VM) with each of the virtual ports of the VM-to-VM switch 610. Associating the one VM with each of the virtual ports of the VM-to-VM switch may further include, storing the association between the VMs and the virtual ports of the VM-to-VM switch in a look-up table. In an additional embodiment, associating one VM with each of the virtual ports of the VM-to-VM switch may further include identifying a virtual media access control (vMAC) address of each VM and associating the vMAC address of the VM with one of the virtual ports of the VM-to-VM switch. In one embodiment, associating a virtual machineto-virtual machine (VM-to-VM) switch embedded in a network interface card (NIC) with a physical port of the NIC, establishing one or more virtual ports of the VM-to-VM switch 605 and associating one virtual machine (VM) with each of the virtual ports of the VM-to-VM switch is performed by the initialization circuitry 110 of the VM-to-VM switch 100.

The method further includes intercepting a network frame between a source VM and a destination VM 615, identifying the VLAN ID of the source VM within the intercepted network frame 620 and rewriting the VLAN ID of the Source VM in the intercepted network frame to the VLAN ID of the destination VM 625. In one embodiment, intercepting a network frame between a source VI and a destination VM 615, identifying the VLAN ID of the source VM within the intercepted network frame 620 and rewriting the VLAN ID of the Source VM in the intercepted network frame to the VLAN ID of the destination VM 625 is performed by the VLAN rewriting circuitry 145 of the VM-to-VM switch 100.

The method further includes routing the intercepted network frame from the source VM to the destination VM 630, thereby providing hypervisor switch offloading. In one embodiment, routing the network frame from the source VM to the destination VM through the VM-to-VM switch is performed by the routing circuitry 115 of the VM-to-VM switch 100.

In one embodiment, the VM-to-VM switch is a single root I/O virtualization (SR-IOV) enabled switch, and associating one VM with each of the virtual ports of the VM-to-VM switch further comprises, assigning a virtual Media Access Control (vMAC) address to the VM, associating the assigned vMAC addresses with a Virtual Function (VF) associated with the Physical Function (PF) of the SR-IOV enabled switch and storing the assigned vMAC address and the associated VF in a look-up table. Additionally, routing network frames between the VMs associated with the virtual ports through the VM-to-VM switch may further include receiving a network frame originating from a source VM, the network frame including a vMAC address of the source VM and a vMAC address of the destination VM, wherein each vMAC address includes an Organizationally Unique Identifier (OUI) identifying a Physical Function (PF) of the SR-IOV enabled switch, comparing the vMAC address of the source VM and the vMAC address of the destination VM of the network frame and if the OUI of the vMAC address of the source VM is equal to the OUI of the vMAC address of the destination VM of the network frame, using the vMAC address of the destination VM to identify the VF associated with the destination VM and routing the network frame to the VF associated with the destination VM.

The method of the present invention may further include prioritizing the network frames prior to routing the network frames, assigning Quality of Service (QoS) to the network frames using the VM-to-VM switch assigning security features to the network frames using the VM-to-VM switch and monitoring the network frames using the VM-to-VM switch.

With reference to FIG. 7, in a particular embodiment of the invention, the vNic Switch Ports 450 shown in FIG. 4 are supported by logic further enumerated here as the Switch Node 785 and the vNic Switches 475 shown in FIG. 4 are supported by logic further enumerated here as the Switch Fabric 795.

In the embodiment of FIG. 7, a VM 702 is indicated as 'Host 1' which is capable of sending Ethernet Frames indicating a particular VLAN ID in the header of the Ethernet Frame to VLAN 8 704. The VM 702 is running on a system (not shown) containing a Hypervisor mapped to a physical server's hardware resources such as CPU, memory, USB ports, bus endpoints and Switch Node 785. The invention as a system in this embodiment is described, in part by the Switch Node 785, the Switch Fabric 795, and the unique capabilities of the present invention.

In the embodiment illustrated in FIG. 7, an administrator of the present invention can select or create a policy through a user interface 768 which permits imposing an enforcement policy from an enforcement module 722 on the Quality of Service assigned to Frames and Packets by the Host 702. The enforcement policy imposed by the enforcement module 722 is a per-interface interpretation of the User Configuration Logic 768 which is allocated and distributed to each interface via the Distributed Logic Module 766. Certain characteristics involve measuring aggregate statistics which is enabled by the Frame packet-in copier 718 which copies all frames in the read buffer 716. A feedback connection exists between the Aggregation Bus 764 which can collect per-interface statistics of frames in the Switch Fabric 795 across a series of Switch Nodes 705, 715. Switch Fabric Port 798 is coupled to Switch Node 705 and Switch Fabric Port 799 is coupled to Switch Node 715. Receive Frame/Packet into Buffer 796 is coupled to Switch Fabric Port 799 and Receive Frame/Packet Into Buffer 794 is coupled to Switch Fabric Port 798. Read Buffer 790 is coupled to Receive Frame/Packet Into Buffer 794 and Read Buffer 792 is coupled to Receive Frame/Packet into Buffer 796. Write Buffer 791 is coupled to Send Frame/Packet 795 and Write Buffer 793 is coupled to Send Frame/Packet 797. The feedback connection allows measurement of quality of service (QoS) in frames which are sent by Host 702 to the frame packet-out copier 760 which include the user configuration provided through the user interface 768. The Frame Packet-Out Copier 760 may be coupled to a Write Buffer 752. The Write Buffer 752 may further be coupled to a Send Frame/Packet module 754, which is coupled to the Switch Node Port 756. This is all supported by User Configuration packet capture logic Module 770 which enables the designation of Quality of Service (QoS) in a Frame to be measured on any header in the Frame, IP Packet or Socket. This unique capability allows the solving of a complex problem wherein a user of the system is improperly configuring QoS based on a characteristic which is not in the policy that is outlined by the administrator or service provider.

An embodiment of the path for a Frame includes a transition from VLAN 8 704 to the Switch host port 708, where the Frame is received 712 and stored in the read buffer 716. The switch host port 708 may further be coupled to a module to Capture the originating VLAN and Port # as Metadeta 710. The Frame is then copied in the Frame packet-in copier 718 and sent to the aggregation module 726 for statistics collection. The flow of the Frame proceeds to the Enforcement Module 722 where the User Configuration for QoS limiting based on packet rate and other enforcement policies are applied through the user interface 768. Next, the buffer is evaluated and the appropriate fields are parsed 724 which allow data and unmodified header fields to be maintained 730 and a subset of fields to be copied that require modification 720. The fields that are copied help determine the path 714 based on User-defined QoS on Host 1 702 in the Frame, which may be Packet header fields, tags or labels.

The embodiment allows several methods of complex logic to be implemented using the Frame Packet analysis Module 762 configured to analyze the Packet header fields, tags or labels so that it may analyze any form of QoS or other fields. The logic can be imposed as inbound QoS assigned by the VM being evaluated and if necessary the packet can be dropped by the Enforcement Module 722. The logic in this embodiment can be imposed as a user defined Quality of Service based upon any characteristic found in the Frame, Packet or TCP/UDP header such as port number, source or destination address, IP Flags, source or destination MAC address, priority fields or the QoS field itself. Restated, the QoS of a Frame or Packet can be read as a statistic in Aggregation Module 726, permitted to pass to the Enforcement Module 722 and evaluated for modification in Evaluate Buffer and Parse appropriate fields Module 724. The packet may then be determined to be inconsistent with the QoS in Module 734 which determines the appropriate QoS fields such as type of service, field in IPv4 header or traffic class in IPv6, as defined in the User Interface Module 768. User configured QoS rules may be provided by a module 735 coupled to module for determining that the packet is inconsistent 734. The Quality of Service field may then be modified by writing new values to the Quality of Service Fields 732 and all new field which have been modified can then be added to the appropriate fields in the Frame or Packet in the Module 748. The Frame Packet Analysis Module 762 which can capture based on User Configuration Packet Capture Logic 770, can be part of a feedback loop which collects modified Frames by means of the Frame packet-out copier 760 after all fields have been modified 748. Quality of Service Graphing Module 778 may be coupled to the Frame Packet Analysis module 762. Quality of Service Graphing Module 778 may further be coupled to HTTP Server 780. Other more complex feedback mechanisms may include frame analysis by a Frame Packet Analysis Module 762 in combination with aggregation by the Aggregation Module 726 and enforcement by the Enforcement Module 722 to allow rapid dynamic methods to permit DevOps management of instantaneously changing Quality of Service algorithms to include external business logic.

The embodiment in FIG. 7 allows the proper determination of Quality of Service Fields and the writing of Quality of Service fields in Frame and Packet headers including Differentiated Services Code Points, Class of Service bits, Flow labels and other bits which are used to indicate Quality of Service. The invention is envisioned as allowing automated methods as well as configurable methods of writing the correct bits to the headers of frames or packets in other conditions, including, but not limited to, tunneling, writing bits to encrypted packets and other methods.

The embodiment may include additional outbound logic 758 not explicitly shown in the Switch Node 785. In this embodiment, Switch Node 785 is connected via a switch node port 756 to the switch fabric port 772 in the Switch Fabric 795. The Switch Fabric 795 is capable of connecting to another Switch Fabric which enables powerful characteristics of Reading QoS and Routing 788 which can be strictly based on Quality of Service headers or based on standard routing and switching protocols. The Reading QoS and Routing of Frames and Packets based on Quality of Service may occur for example in the Type of Service field, the first 6 bits of the field as DSCP or other methods as permitted in the OSI or TCP/IP model.

The strengths of the method of the present invention and the unobvious characteristics are that by adding additional features to the Routing of Frames by Quality of Service (QoS) fields, after having been able to influence the fields, allows the service provider to impose a traffic manipulation and control method on well known methods of imposing closest path algorithms. As such, a host 702 which selects both a QoS and a closest path methodology can be overridden by the provider of the hardware platform and thus can direct traffic to a less expensive destination which is consistent with their policy and business model. The logic and user configuration modules, including the User Configuration of QoS module 768, the User Configuration Packet Capture Logic Module 770, the Distributed Logic Module 766, the Aggregation Bus 764, and the Dynamic QoS Control module 782 in FIG. 7 should be assumed to be available to the Read QoS and Route Module 788 for decision making, or communications, as required to implement the features discussed and more advanced capability.

Additional aspects of the embodiment are illustrated with reference to FIG. 8 where the Read QoS and Route Module 788 is seen to have interaction with several dynamic tables, including a QoS Values to buffer Port Mapping Table 878, a Mac Address to Buffer associated with Switch Fabric Port Mapping Table 880, an IP address to Buffer Associated with Switch Fabric Port Mapping Table 882, A Route Table with Quality of Service Mapping Table 884. The Read QoS and Route Module 788, parses the QoS from the Frame, looks up the appropriate path and routes the Frame 876. The administrative user has the ability to impose a set of rules on the process in module 876 through the HTTP server 886 which sends the rules to 876. An administrative user is envisioned to have the ability to force selection of any route from any routing protocol running on the Switch Fabric.

A clear demonstration of the uniqueness of this embodiment related to an end user of VM Host1 802 choosing to send traffic to the closest host using a known method, such as Anycast. If the end user is running the desired destination service on VM Host2 804, and a remote machine on the network such as External Host4 808, or a distant machine out a similar port (not shown), it is clear that the path the Frame would follow using VLAN X is from the VM Host1 802, to Frame On VLAN X 810 and/or Frame On VLAN Y 812, to Switch node 826, to Switch Fabric Port 834, to Receive Frame/Packet Into Buffer 844, to Read Buffer 860, to Parse QoS, Lookup and Route Module 876, to Write Buffer 866, to Send Frame/Packet 850, to Switch fabric Port 836, to Switch node 828, to Frame On VLAN X 814 and/or to Frame On VLAN Y 8 Receive Frame/Packet into Buffer 796 16, and finally to VM Host2 804, under certain conditions. In the case of an administrative user imposing Quality of Service rules through User Configuration Interface 892, the HTTP Server 886 and Parse QoS, Lookup and Route module 876, which for the selection of a route to the External Host4 808 is facilitated by the Route Table with Quality of Service Mappings 884, the path the Frame would follow using VLAN X is from VM Host1 802, to Frame On VLAN X 810, to nSwith Node 826, to Switch Fabric Port 834, to Receive Frame/Packet into Buffer 844, to Read Buffer 860, to Parse QoS Lookup and Route module 876, to Write Buffer 874, to Send Frame/Packet 858, to Switch fabric Port 842, to Switch node 832, to Frame On VLAN X 822 and/or to Frame On VLAN Y 824 and finally to External Host4 808.

The parse, lookup and route capability provided by Parse QoS Lookup and Route module 876 ensures that a normal routing and switching method may be imposed, however with the addition of dynamic tables allowing for the additional ability of a system which maps QoS values to buffer ports 878, associates MAC Addresses and IP addresses with ports 880, 882 and modifies the route table 884 according to the desires of the administrative user, using the User Configuration Interface 892, the HTTP Server 886 and the Parse QoS Lookup and Route module 876. Among other features, QoS Values to Port Mapping Table 878 directs the writing to the correct buffer after reading the packet QoS.

Pathing internal to the Switch Fabric 801 may be altered based on the above embodiment in ways the inventors have forseen and those not yet envisioned. As an example, a multicast subscriber on VM Host2 804 which is sending multicast join messages to an external network switch at External Host 4 808 may not be able to join the group for a technical reason. The ability to configure a minor non-affecting change to the Frame which is requesting the join from Host2 804 can be redirected using the embodiment's routing based on Quality of Service Type of Service bits or DSCP bits to a listener on Host3 806. Thus, a network switch at Host4 808 without the capability of sophisticated packet debug and capture capability could be observed in the Frame Packet analysis module 762 or even the Host3 VM Operating System with a simple tool like Wireshark or tcpdump. The capability to redirect traffic based on non-service-affecting bits at the end system as well as the capability to redirect based on the bits is both unique and non-obvious.

In an embodiment, VM(s) may be mapped to a single or multiple CPUs, cores or hardware threads of execution on a single or multiple FPGAs, ASICS or microprocessors in single or multiple sockets on single or multiple logic boards.

In accordance with the invention, physical hardware is mapped in an embodiment through virtual and physical functions (VF, PF). The embodiment allows a VM to be able to transfer Ethernet Frames and IP packets between two VMs as well as between a VM and an Ethernet or IP host through an external physical port.

In one such implementation, Switch nodes 785 accepts frames and packets from virtual machines mapping a virtual function to a physical function. The physical function represents the Switch functionality enabled in hardware. The switch accepts the Ethernet frame or IP packet in a buffer and processes the frame or packet according to the configuration of the Switch implementation.

Switch logic in FIG. 7 and FIG. 8 may be implemented completely or partially in hardware or software, and it may be distributed or implemented in a single IC or program. The inventors envision additional functionality emerging when Quality of Service is implemented in singular or multiple modules connected by a bus, where several modules of the Switch Fabric 795 are connected in series and parallel.

In one embodiment, it is envisioned that a method referred to as 'Trusted host mode' will allow the host to set QoS which can allow the host to select the pathing which will be useful for situations where duplicate VMs are used and scaling of NFV (Network Functions Virtualization) because many VMs represent a single hardware device, and there needs to be a switching method which can be determined by the host machine. For security and automation reasons, this is envisioned as being valuable for 2nd tier machines, such as databases where there is no user direct interaction.

In an embodiment, it is envisioned that a method referred to as 'QoS enforcing mode' is suitable for VMs where users have control over the OS and application and the policies they select must be enforced by a service provider like an IT department or a service provider.

Routing based on QoS helps to select which Switch Fabric Port 834, 836, 840, 842 the Frame will be sent to, based on user defined characteristics which can change dynamically as fast as input to the decision engine, which may occur on the order of milliseconds or faster. It is envisioned that external automation of QoS decisions can be implemented through the User Configuration Packet Capture Logic Interface 889. Switch Fabric Port 834 may receive packets from Send Frame/Packet 848 through Write Buffer 862. Switch Fabric Port 836 may send packets to Receive Frame/Packet into Buffer 848 and through to Read Buffer 864. Switch Fabric Port 840 may send packets to Receive Frame/Packet into Buffer 852 and through to Read Buffer 868. Switch Fabric Port 840 may receive packets from Send Frame/Packet 854 through Write Buffer 870. Switch Fabric Port 842 may send packets to Receive Frame/Packet into Buffer 856 and through to Read Buffer 872.

Quality of Service Graphing module 888 allows the inbound and outbound characteristics including Host-sent-QoS fields and User-enforced-changed-QoS fields to be observed as it receives information from the Frame Packet Analysis module 762 so it can be determined what is being configured at the host and what Switch does with the frame/packet. Module connections between the HTTP Server 886 and Aggregation Module 726 and Frame Packet Analysis Module 762 are not shown, similarly others are not shown which have been envisioned by the inventors.

In an embodiment providing enforcement by applying rate limiting over a group of buffers, a Frame or Packet may originate from a given switch host port 708, VLAN 704, 706 or quality of service level in the Frame, which is not shown in the FIG. 7 but it is envisioned to be represented by the first 6 bits in the Type of Service field in the IP packet header contained within an Ethernet Frame. Ethernet frame as used in the embodiment descriptions can be replaced by IP Packet Header. It should be noted that node ports are a component within the Aggregation Module 726, the Firmware Logic and User Interface Configured Logic Module 728, the Keep All Header Fields and Data which is Not Modified Module 730 and the Write New Values to Quality of Service Fields Module 732.

The origin and both Frame and Packet Headers will determine the 'switching' or 'routed' Path through the Switch Fabric and will further determine the destination switch port host 708, or within Switch nodes 826, 828, 830, 832 sending the Frame or IP traffic to VM Hosts External 765, 775 or VMS Hosts 802, 804, 806, 808 over a VLAN with a QoS which has been enforced by the Copy all field which need Modification Module 720, written by the Write New Values to QoS Fields module 732, added by the Add All Fields Which Have Been Modified Module 748 and routed by the Read QoS and Route Module 788, and Parse QoS, Lookup and Route Module 876 per configuration provided by User Configuration Interface 892 and HTTP Server 886. User Configuration Interface 892 may be coupled to Parse QoS, Lookup and Route Module 876 through connection 894. Frame On VLAN X 725 and Frame On VLAN Y 735 may be coupled to VM Host External Host2 765. Frame On VLAN X 745 and Frame On VLAN Y 755 may be coupled to VM Host External Host2 775. The embodiment enables the host received QoS to be over-ridden by the information from the User Configuration Interface 892 which determines system level characteristics and implements the desires of the administrative user of the Switch Node 785, Switch Fabric 795, 890 components and building blocks.

It can be envisioned by the inventors that the outbound logic may additionally contain enforcement provided by Enforcement Module 722 allowing the administrator to police the traffic being routed to be limited based on the logic after routing. This embodiment would prevent users of VMs who have discovered the mapping of QoS logic internal to the system, to be unable to bypass the limitations set by the inbound Enforcement Module 722 after the mapping has occurred. Without this capability, it would be possible to circumvent the system in a way that is far more difficult than a system which cannot write the QoS, but still may raise security concerns in systems intended to be High Security. The present invention provide gives complete routing and filtering, thereby having complete control in the Switch Node and Switch Fabric. It is envisioned that duplicate enforcement occurs in each Switch node, the first enforcement is in the Host configured Quality of Service in the Frame or Packet header and the second enforcement is in the distributed logic module which enforces the Switch Admin (user configuration) to set the QoS bits in the frame packet header. Note that this is a single buffer for a single packet, but that this occurs for multiple packets across multiple buffers and that rate limiting applies to a group of packets concurrently in the group of buffers.

In a particular embodiment, the following bidirectional paths are envisioned: (1) VM into Switch fabric, (2) Switch fabric to Switch node, (3) Switch fabric to physical port and (4) Switch physical port to Switch node.

In one embodiment the HTTP server 886 is envisioned to permit an Switch to serve web pages with QoS from host, QoS graphing provided by the Quality of Service Graphing Module 888, and actual after Switch rules applied from various locations such as the Read QoS and Route Module 788, the Parse QoS, Lookup and Route Module, 876, the Frame Packet Analysis Module 762, the User Interface for Rules Configuration 768, User Configuration Packet Capture Packet 770, User Configuration Interface 892 and associated user Configuration features.

In this embodiment, the Aggregation Bus 764 is where counters are summed for the Switch ports 708 so the quality of service, which is in the frame and packet headers, can be measured collectively.

In an embodiment, it is envisioned that the routing of frames based on QoS by Read and Route QoS Module 788, and by Parse QoS, Lookup and Route Module 876, will be used in combination with modification of MAC Addresses or IP addresses in order to create new techniques for intercepting and routing packets. For example, a 'root' privilege is required on nearly any Operating System to put a port in promiscuous mode on a VM host and to capture network traffic not destined for the VM. By using network address translation to an IP and MAC Broadcast address, the VM will accept the traffic without a 'root' privilege and by redirecting that traffic to only one host, a VM user with normal privilege can use Wireshark to capture the packets. While this may not seem significant, the result is the capability of allowing non-root users the ability to troubleshoot problems which increases the security of the network, and more significantly when it is not necessary to issue 'root' privilege on hosts to Network Engineers and Administrators. This capability is unique; there is no other practical solution to the problem of having to give 'root' privilege to engineers so they can sniff packets which are not associated with the IP address of their current system on a VM. Other methods involving unicast, broadcast, multicast and Anycast are envisioned by the inventors.

It is known that Anycast can be used to determine nearest node for a group of devices that are functionally equal. By writing the QoS and using the written bits to guide and route the Anycast communications, the end device may be selected by the host sending the communication. In the present invention, the embodied Switch has the capability of enforcing QoS so that traffic can be re-routed, as determined by the administrator of the Switch hardware. More importantly, for a dynamic method of destination allocation, an interface is implemented in the Switch hardware permitting those decisions to be made in real time from any number of sources. For example, the decisions may be from VM management software, dependent on some other software process, which is aware of system characteristics. As such, the determination of packets in transit may be modified by the embodied Switch by rewriting the QoS and thus redirecting the packets. While not shown, but assumed to be present, are the regular routing tables, MAC address port mappings associated with other methods of routing packets other than the unique Anycast:QOS methods described herein.

In an embodiment, the QoS Routing with unicast rewrites the destination IP address to allow writing to the exterior LAN port or to broadcast, thereby allowing internal routing of QoS to take precedence over typical routing methods.

The Frame Package Analysis Module 762 is capable of using the attached storage 703 and other storages uses are envisioned by the inventors.

In addition, a characteristic of the Enforcement Module 722 is that the Enforcement Module drops Host1 702 frames and packets which do not conform to the 'distributed logic module' contained in the configured rules for that Host1 QoS level. The Enforcement Module may also be configured to pass these frames and packets and the user may choose to rewrite the QoS bits, for example the DSCP bits in the TOS field of the IP packet. The Distributed logic module 766 can place rules on frames or packets based on characteristics in their headers, labels or tags or bits which make up the frame or packet. The Aggregation Module 726, in one embodiment, sends the rate of incoming packets per VLAN per port so it can be summed at the Aggregation Bus and the policy, which is configured by the user, can be compared and enforced through this point.

Frame packet duplication occurs with simultaneous reads of the destinations, because the signals inside a Switch node are on copper and the Frame Packet duplicator is copper that has multiple connections for each wire that comes into the Switch Port, as such, one is connected to the port, the other is connected to the next module the frame is forwarded to and the third is connected to the frame packet copier.

In the present invention, logic in the Switch Node 785 determines User Configured (UC) limit of Host1 configured QoS VLAN per Switch Port Policy configured in UCI and, if there is inconsistency, the appropriate fields, such as the DSCP bits in the TOS header are changed to be compliant with the UC policy.

Additional modules are seen in FIG. 8 in the Switch Fabric 801 to support use of DHCP and DNS. Other tables are envisioned in the Switch Fabric such as a table to list VM's virtual Mac Address and virtual Function and associated IP address, or a table to list Physical Port or DMA details associated with virtual or physical Mac Address or Methods such as Directing Frames to Physical or Virtual Functions.

An envisioned Switch architecture 803 is illustrated in FIG. 8. The switch architecture includes a switch node, a switch fabric, a Medium Access MAC/PHY, a DMA Interface, a Control Logic and a Memory, coupled through a Bus Structure.

Route selection in the Switch Fabric 801, in one embodiment, follows the same process as a routing protocol. In a standard routing protocol, like OSPF a process determines candidate routes and the best route or routes are chosen and inserted into the routing table. In the present invention the routing table also contains a Quality of Service field. The QoS field is used to determine the buffer and next hop of the IP Packet. In the cast of the Routing Engine 876, a packet which comes from Host1 802 which is directed to 10.200.0.1, without the DSCP/TOS bits set, would be directed to write buffer 874, to Send Frame/Pack 858, to Switch node 842 and ultimately to External Host4 808, which is in this embodiment, a network router. However, in the case of Differentiated Services Code Point bits in the Type of Service IP Header being set to AF31, a column in the routing table in Routing Engine 876, the next hop would be set to the VM Host3 806 following the route from Send Frame/Packet 854, to Switch fabric Port 840 and to Switch node 830. In FIG. 8, the route table 805 is shown for the local Switch Fabric 801, using IP addresses and DSCP bits as QoS decision points to direct the traffic ultimately to the sources labeled in the diagram as VM Host2 804, VM Host 3 806, for conceptual clarity. VM Host 3 806 may further be coupled to Frame On VLAN X 818 and/or Frame On VLAN Y 820. The destination shows an IP address and subnet mask for IP Address 10.200.0.1 with a 32 bit subnet mask. If the QoS bits indicate AF31, which are the 6 bits of the TOS field represented by DCSP are "011 010", then the packet is directed locally to the VM. The direction and IP addresses as well as DSCP bits may follow any user preference as indicated by the configuration provided by the User Configuration Interface 892.

In an embodiment, an Ethernet Frame is given Quality of Service marking by modifying the 3-bit PCP field in the 802.1Q header. Thus, the bits must be passed to the Parse, Lookup and Route Engine in 876. Two methods are envisioned, and other assumed possible. The first method reads the Frame PCP bits and encodes the DSCP bits moving the encoding information from the Frame header at Layer 2 to the IP header at Layer 3 and the system routes as described previously in the operation of the Parse, Lookup and Route Engine 876. An alternative embodiment would allow a Frame with 802.1Q header and PCP bits which are set to progress through to the Parse, Lookup and Route Engine 876 and use a separate field to show PCP bits as shown in the Route QoS Lookup Table 805.

In an embodiment, the invention reads bits in the Type of Service field in the IP header, which are assigned to designate the Quality of Service with Differentiated Services Code Points (DSCP) and makes a path determination for the IP Packet in the read buffer 784. Read Buffer 784 may be coupled to Receive Frame Packet Into Buffer 774. It is envisioned by the authors that the Quality of Service field in which a packet enters the Switch node 785 from an external or an internal host may be rewritten or changed by the Write New Values to Quality of Service Fields Module 732 in the Switch node in order to make a routing decision for the packet based upon the new value provided by the Read QoS and Route Module 788. However, outbound logic 758 could, as conceived by the inventors, be preserved as meta-data and reassigned to the IP Packet after a routing, path determination in the write buffer 786 when exiting the destination Switch Node 715. Write buffer 786 may be coupled to Send Frame/Packet Buffer 776. Many other methods of implementation could preserve the DSCP bits, by a minor logic change, the Packet Characteristics which meet the User configured QoS rules 738, could be used to draft logic which modifies the route table 805 to inject the quality of service as defined by the user of the VM 702. The module for providing the User Configured IP address rules 738 may further be coupled to a module for the Destination IP address and Destination port 740, which may further be coupled to a module 742 to Write New Source or Destination IP Addresses and to a module 744 to Determine Destination MAC address. The module to Determine destination MAC address 744 may further be coupled to a module to Determine Outbound Port Using QoS and Routing Metrics 750 and to a module 746 to Write New Source or Destination MAC Addresses.

An embodiment which allows the user to select only DSCP bits not used on the network for quality of service is envisioned.

At a high level, the VM-to-VM switch is manageable with standard attributes in hardware physical switches. The features are existent in the hardware and enabled through a software interface which is reachable over management through the network port, via USB, via software on the hypervisor or from a properly configured VM.

At the Internet Protocol (IP) layer (layer 3) the switch is capable of marking (setting) Differentiated Service Code Point (DSCP) bits in the packet header and reading them. At the Media Access Control (MAC) Layer (layer 2) the switch is capable of 802.1Q and 802.1p which is the marking of priority bits in the header. This is accomplished in hardware by having both hardware queues, buffers, a hardware classifier and Ethernet controller which is QoS capable for both IPv4 and IPv6. Hardware implementation follows RFC 2474 and RFC 2990. The features are supported and enabled via a software interface which is reachable over management IP address of the switch or via configuration of the switch through a manual configuration over a USB cable or via software on the host computer through the hypervisor (which supports the VMs). VMs on all major hypervisors are capable of configuration of QoS transparently. Examples of queuing supported in hardware: class based queuing (CBQ) and weighted fair queuing (WFQ) and standards are followed for software configuration RFC 4594.

Hardware support for Access Lists is envisioned by subjecting packet paths to a filter which is open to the passing of all properly formed packets with no rules applied. Application of rules in the configuration of the VM-to-VM switch will permit software configuration to be pushed to the hardware comparison rule set implementing the software control structure to be applied to the hardware mechanism using the control/data plane paradigm in which the rule set is held in hardware cache memory and applied to passing frames and IP packets.

802.1Q support in VM-to-VM hardware is the ability to both read, write and direct traffic based upon the 32 bit VLAN tag which is in an 802.1Q frame (which is a MAC frame with the 4 bytes which identify the assigned VLAN). Both hypervisors and VMs currently support this permitting a VM to belong to multiple broadcast domains The VM-to-VM switch supports this by allowing 802.1Q trunking between the VM-to-VM switch fabric and the VM and hypervisor. 802.1q is currently supported in OpenVSwitch which is the software switching in most hypervisors, as well as standard existing network hardware switches.

Because monitoring of network frames is configurable by software which can be accessed from the hypervisor, which is accessible to the VM as well (over the network management interface of the VM-to-VM switch NIC) then a VM is capable of initiating a promiscuous mode on a given VLAN and listening to all traffic on the VLAN using this in combination with 802.1q trunking to the VM.

VM-to-VM switch will still therefore, with 802.1q trunking, have the ability to switch between VLANs and locally allow traffic to go between different VLANs and subnets (broadcast domains) directly without requirement of leaving the NIC card. This is supported in hardware by allowing an IP level in the switch (technically permitting it to be a Layer 3 switch which is known as a Router with the simple application of a routing protocol as well).

The VM-to-VM switch architecture improves the VM-VM switching performance for traffic in the same computer across multiple CPUs and sockets. The VM-to-VM switch is compatible with the SR-IOV3 specification without any Ethernet frame alteration. By implementing the VM-to-VM switch functionality as an enhancement to SR-IOV, the architecture will enable all high-load inter-VM traffic without the framing or other overhead introduced by 802.1Qbg or 802.1Qbh. VM-to-VM switching is envisioned as being implementable without SR-IOV and with or without internal modification to the framing. The present invention allows a VM to select the VM-to-VM switch reflective relay group in which the VM participates by vMAC Address, thus enabling the VM management software to provide additional dynamic control. VM-to-VM switch allows CPU optimization across multiple CPU cores, and the current implementation provides a tool for additional research in VM optimization due to switching based on vMAC Address. The method used also allows traffic switched through the VM-to-VM switch to be monitored, allowing visibility into the network traffic that is currently only provided by a sniffer used in conjunction with a physical vendor provided.

The VM-to-VM switch is applicable and suitable for both wired and advanced wireless networking architectures that are implemented with virtual machines. There is a considerable need for virtualized, low power, mobile network nodes to reduce their power and channel utilization, for which the VM-to-VM switch technique could be very useful, such as the virtualization of mobile routing nodes in ad-hoc networks such as those deployed for dynamic search-and-rescue networks in remote areas. Reduction of CPU utilization reduces power consumption and VM-to-VM switch will reduce precious wireless channel bandwidth as well.

VM-to-VM switching does not limit the switching of Ethernet Frames to implementation in software, which causes excessive interrupts to the CPU and dramatically limits the information that can be passed between VMs on the same server hardware. This completely eliminates a CPU-Interrupt problem, which is common in all VM hardware that does not implement the VM-to-VM switch. This is a defining feature and is why this technology is essential to manufacturers of Ethernet switching technology.

The advantages set forth above, and those made apparent from the foregoing disclosure, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of routing network frames between virtual machines on a common physical server comprising a plurality of central processing units (CPUs), the method comprising:

associating a virtual machine-to-virtual machine (VM-to-VM) switch embedded in a network interface card (NIC) with a physical port of the NIC;

establishing two or more virtual ports of the VM-to-VM switch;

associating at least one virtual machine (VM) of a first CPU with a first one of the virtual ports of the VM-to-VM switch and associating at least one virtual machine (VM) of a second CPU with a second one of the virtual ports of the VM-to-VM switch, wherein the first CPU and the second CPU are on a common physical server;

receiving network frames from the physical port of the NIC and from the virtual ports of the VM-to-VM switch, wherein the network frames comprise a Quality of Service (QoS) written into an Internet Protocol (IP) packet header of the network frames, wherein the QoS identifies a routing path for the network frames;

reading, at the VM-to-VM switch, the QoS written in the IP packet header of the network frames to determine if the QoS of the network frames is consistent with a QoS assigned to the network frames by a user configuration module;

modifying the QoS of the network frames by rewriting the QoS in the IP packet header of the network frames, using hardware in the VM-to-VM switch, to be consistent with the QoS assigned to the network frames by the user configuration module if it is determined that the QoS of the network frames is not consistent with the QoS assigned to the network frames by the user configuration module; and routing network frames between the VMs associated with the virtual ports through the VM-to-VM switch based upon the QoS modified by the VM-to-VM switch.

2. The method of claim 1, wherein associating the one VM with each of the virtual ports of the VM-to-VM switch further comprises storing the association between the VMs and the virtual ports of the VM-to-VM switch in a look-up table.

3. The method of claim 1, wherein associating one VM with each of the virtual ports of the VM-to-VM switch further comprises:

identifying a virtual media access control (vMAC) address of each VM; and associating the vMAC address of the VM with one of the virtual ports of the VM-to-VM switch.

4. The method of claim 1, wherein routing network frames between the VMs associated with the virtual ports through the VM-to-VM switch further comprises:

storing the association between the VMs and the virtual ports of the VM-to-V switch in a look-up table;

receiving a network frame originating from a source VM, at the VM-to-VM switch, the network frame identifying a destination VM;

accessing the look-up table to identify the virtual port associated with the destination VM; and routing the network frame to the destination VM through the VM-to-VM switch.

5. The method of claim 1, wherein the VM-to-VM Switch is a single root I/O virtualization (SR-IOV) enabled switch.

6. The method of claim 1, wherein the VM-to-VM switch is a single root I/O virtualization (SR-IOV) enabled switch, and associating one VM with each of the virtual ports of the VM-to-VM switch further comprises:

assigning a virtual Media Access Control (vMAC) address to the VM;

associating the assigned vMAC addresses with a Virtual Function (VF) associated with the Physical Function (PF) of the SR-IOV enabled switch; and storing the assigned vMAC address and the associated VF in a look-up table.

7. The method of claim 3, wherein the VM-to-VM switch is a single root I/O virtualization (SR-IOV) enabled switch and wherein each vMAC address includes an Organizationally Unique Identifier (OUI) identifying a Physical Function (PF) of the SR-IOV enabled switch.

8. The method of claim 1, wherein the VM-to-VM switch is a single root I/O virtualization (SR-IOV) enabled switch and routing network frames between the VMs associated with the virtual ports through the VM-to-VM switch further comprises:

receiving a network frame originating from a source VM, the network frame including a vMAC address of the source VM and a vMAC address of the destination VM, wherein each vMAC address includes an Organizationally Unique Identifier (OUI) identifying a Physical Function (PF) of the SR-IOV enabled switch;

comparing the vMAC address of the source VM and the vMAC address of the destination VM of the network frame;

if the OUI of the vMAC address of the source VM is equal to the OUI of the vMAC address of the destination VM of the network frame, using the vMAC address of the destination VM to identify the VF associated with the destination VM; and routing the network frame to the VF associated with the destination VM.

9. The method of claim 1, further comprising prioritizing the network frames prior to routing the network frames.

10. The method of claim 1, further comprising assigning security, features to the network frames using the VM-to-VM switch.

11. The method of claim 1, further comprising monitoring the network frames using the VM-to-VM switch.

12. The method of claim 1, wherein the VMs associated with the virtual ports are located on different virtual local area networks (VLANs), the method further comprising utilizing a router protocol of the VM-to-VM switch to route the network frames between the VMs associated with the virtual ports.

13. The method of claim 1, further comprising:

intercepting a network frame between a source VM and a destination VM;

identifying the virtual local network identification (VLAN ID) of the source VM within the intercepted network frame;

rewriting the VLAN ID of the source VM in the intercepted network frame to the VIAND of the destination VM; and routing the intercepted network frame from the source VM to the destination VM.

14. A virtual machine-to-virtual machine (VM-to-VM) switch embedded in a network interface card (NIC), the switch comprising:

initialization circuitry configured for associating the virtual machine-to-virtual machine (VM-to-VM) switch with a physical port of the NIC, for establishing two or more virtual ports of the VM-to-VM switch and for associating at least one virtual machine (VM) of a first CPU with a first one of the virtual ports of the VM-to-VM switch and associating at least one virtual machine (VM) of a second CPU with a second one of the virtual ports of the VM-to-VM switch, wherein the first CPU and the second CPU are on a common physical server;

receiving circuitry configured for receiving network frames from the physical port of the NIC and from the virtual ports of the VM-to-VM switch, wherein the network frames comprise a Quality of Service (QoS) written into an Internet Protocol (IP) header of the network frames, wherein the QoS identifies a routing path for the network frames;

circuitry configured for reading the QoS written in the IP packet header of the network frames to determine if the QoS of the network frames is consistent with a QoS assigned to the network frames by a user configuration module;

circuitry configured for modifying the QoS of the network frames by rewriting the QoS in the IP packet header of the network frames, using hardware in the VM-to-VM switch, to be consistent with the QoS assigned to the network frames by the user configuration module if it is determined that the QoS of the network frames is not consistent with the QoS assigned to the network frames by the user configuration module; and routing circuitry configured for routing network frames between the VMs associated with the virtual ports through the VM-to-VM switch based upon the QoS modified by the circuitry of the VM-to-VM switch.

15. The VM-to-VM switch of claim 14, wherein the initialization circuitry is further configured for identifying a virtual media access control (vMAC) address of each VM and for associating the vMAC address of the VM with one of the virtual ports of the VM-to-VM switch.

16. The VM-to-VM switch of claim 14, wherein the routing circuitry is further configured for receiving a network frame originating from a source VM, at the VM-to-VM switch, the network frame identifying a destination VM, and for accessing the look-up table to identify the virtual port associated with the destination VM and routing the network frame to the destination VM through the VM-to-VM switch.

17. The VM-to-VM switch of claim 14, wherein the VM-to-VM switch is a single root I/O virtualization (SR-IOV) enabled switch and the initialization circuitry is further configured for assigning a virtual Media Access Control (vMAC) address to the VM, for associating the assigned vMAC addresses with a Virtual Function (VF) associated with the Physical Function (PF) of the SR-IOV enabled switch and for storing the assigned vMAC address and the associated VF in a look-up table.

18. The VM-to-VM switch of claim 17, wherein the VM-to-VM switch is a single root I/O virtualization (SR-IOV) switch and wherein each vMAC address includes an Organizationally Unique Identifier (OUI) identifying a Physical Function (PF) of the SR-IOV enabled switch.

19. The VM-to-VM switch of claim 15, wherein the VM-to-VM switch is an SR-IOV enabled switch and the routing circuitry is further configured for receiving a network frame originating from a source VM, the network frame including a vMAC address of the source VM and a vMAC address of the destination VM, wherein each vMAC address includes an Organizationally Unique Identifier (OUI) identifying a Physical Function (PF) of the SR-IOV enabled switch, for comparing the vMAC address of the source VM and the vMAC address of the destination VM of the network frame and if the OUI of the vMAC address of the source VM is equal to the OUI of the vMAC address of the destination VM of the network frame, using the vMAC address of the destination VM to identify the VF associated with the destination VM and for routing the network frame to the VF associated with the destination VM.

20. A method of routing network frames between virtual machines on a common physical server comprising a plurality of central processing units (CPUs), the method embodied in software embedded in a non-transitory software medium operable on a network interface card (NIC), the method comprising:

associating a virtual machine-to-virtual machine (VM-to-VM) switch embedded in a network interface card (NIC) with a physical port of the NIC;

establishing two or more virtual ports of the VM-to-VM switch;

associating at least one virtual machine (VM) of a first CPU with a first one of the virtual ports of the VM-to-VM switch and associating at least one virtual machine (VM) of a second CPU with a second one of the virtual ports of the VM-to-VM switch, wherein the first CPU and the second CPU are on a common physical server;

receiving network frames from the physical port of the NIC and from the virtual ports of the VM-to-VM switch, wherein the network frames comprise a Quality of Service (QoS) written into an Internet Protocol (IP) packet header of the network frames, wherein the QoS identifies a routing path for the network frames;

reading, at the VM-to-VM switch, the QoS written in the IP packet header of the network frames to determine if the QoS of the network frames is consistent with a QoS assigned to the network frames by a user configuration module;

modifying the QoS of the network frames by rewriting the QoS in the IP packet header of the network frames, using hardware in the VM-to-VM switch, to be consistent with the QoS assigned to the network frames by the user configuration module if it is determined that the QoS of the network frames is not consistent with the QoS assigned to the network frames by the user configuration module; and routing network frames between the VMs associated with the virtual ports through the VM-to-VM switch based upon the QoS modified by the VM-to-VM switch.

* * * * *